US012603402B2

(12) United States Patent　　　　　(10) Patent No.:　US 12,603,402 B2
Xu et al.　　　　　　　　　　　　　　(45) Date of Patent:　Apr. 14, 2026

(54) BATTERY CELL WITH ALUMINUM COMPONENTS, BATTERY, AND ELECTRIC APPARATUS

(71) Applicant: CONTEMPORARY AMPEREX TECHNOLOGY CO., LIMITED, Ningde (CN)

(72) Inventors: Hu Xu, Ningde (CN); Haizu Jin, Ningde (CN); Fenggang Zhao, Ningde (CN); Shaojun Niu, Ningde (CN); Rui Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/317,145

(22) Filed: Sep. 3, 2025

(65) Prior Publication Data

US 2026/0005415 A1　　Jan. 1, 2026

Related U.S. Application Data

(63) Continuation of application No. PCT/CN2023/119134, filed on Sep. 15, 2023.

(51) Int. Cl.
H01M 50/562　　(2021.01)
H01M 4/66　　　(2006.01)
(Continued)

(52) U.S. Cl.
CPC ......... H01M 50/562 (2021.01); H01M 4/661 (2013.01); H01M 10/054 (2013.01);
(Continued)

(58) Field of Classification Search
CPC ........ H01M 4/64; H01M 4/66; H01M 50/531; H01M 10/0587; H01M 10/0431; H01M 50/534
See application file for complete search history.

(56) References Cited

U.S. PATENT DOCUMENTS

2003/0064285 A1*　4/2003　Kawamura ......... H01M 50/152
　　　　　　　　　　　　　　　　　　　　429/129
2014/0170452 A1*　6/2014　Abe ...................... H01M 4/661
　　　　　　　　　　　　　　　　　　　　429/223

(Continued)

FOREIGN PATENT DOCUMENTS

CN　　　109155415 A　　1/2019
CN　　　109155433 A　　1/2019
(Continued)

OTHER PUBLICATIONS

International Search Report in the international application No. PCT/CN2023/119134, dated Dec. 14, 2023, 8 pages with English translation.

(Continued)

*Primary Examiner* — Imran Akram
(74) *Attorney, Agent, or Firm* — K&L Gates LLP

(57)　　　　　ABSTRACT

A battery cell, a battery, and an electric apparatus are disclosed. The battery cell includes: an electrode assembly including a positive electrode plate and a negative electrode plate, where the positive electrode plate includes a positive electrode current collector and a positive electrode active material disposed on the positive electrode current collector, the positive electrode active material including an active material capable of reversibly deintercalating and intercalating sodium ions, and the negative electrode plate includes a negative electrode current collector, the negative electrode current collector including a metal substrate; where a constituent material of the metal substrate includes element aluminum, and a mass percentage of the element aluminum is greater than a mass percentage of each of other elements.

17 Claims, 16 Drawing Sheets

<div style="display:flex">
<div>

(51) Int. Cl.
    *H01M 10/054*     (2010.01)
    *H01M 50/103*     (2021.01)
    *H01M 50/15*     (2021.01)
    *H01M 50/534*     (2021.01)

(52) U.S. Cl.
    CPC ......... *H01M 50/103* (2021.01); *H01M 50/15* (2021.01); *H01M 50/534* (2021.01)

(56)             References Cited

U.S. PATENT DOCUMENTS

| | | | | |
|---|---|---|---|---|
| 2020/0266449 A1* | 8/2020 | Laptyeva | ................. | C22C 21/00 |
| 2021/0098768 A1* | 4/2021 | Imabori | .............. | H01M 50/516 |
| 2023/0139959 A1* | 5/2023 | Matsumoto | ............. | H01M 4/46 29/623.1 |

FOREIGN PATENT DOCUMENTS

| | | | | |
|---|---|---|---|---|
| CN | 110021755 A | | 7/2019 | |
| CN | 113130896 A | * | 7/2021 | .............. H01M 4/62 |

</div>
<div>

| | | | | |
|---|---|---|---|---|
| CN | 113437354 A | | 9/2021 | |
| CN | 113451546 A | | 9/2021 | |
| CN | 114597478 A | | 6/2022 | |
| CN | 114709368 A | | 7/2022 | |
| CN | 114824167 A | | 7/2022 | |
| CN | 217387216 U | | 9/2022 | |
| CN | 115701884 A | | 2/2023 | |
| CN | 116417685 A | * | 7/2023 | ........ H01M 10/0587 |
| CN | 116454202 A | | 7/2023 | |
| CN | 118357615 A | * | 7/2024 | ............ B23K 37/00 |
| WO | 2022267538 A1 | | 12/2022 | |

OTHER PUBLICATIONS

ISA Written Opinion in the international application No. PCT/CN2023/119134, dated Dec. 14, 2023, 6 pages with English translation.

* cited by examiner

</div>
</div>

BATTERY CELL WITH ALUMINUM COMPONENTS, BATTERY, AND ELECTRIC APPARATUS

TECHNICAL FIELD

The present disclosure relates to the field of battery technology, and in particular, to a battery cell, a battery, and an electric apparatus.

BACKGROUND

With increasing environmental pollution, the new energy industry has attracted growing attention. For the new energy industry, battery technology is an important factor in connection with its development. Due to the abundant reserves and low cost of sodium salt raw materials, as well as the more stable electrochemical performance compared to lithium-ion batteries, research on sodium-ion system-based batteries has gradually gained attention.

SUMMARY

According to an aspect of the present disclosure, a battery cell is provided, including:

an electrode assembly including a positive electrode plate and a negative electrode plate, where the positive electrode plate includes a positive electrode current collector and a positive electrode active material disposed on the positive electrode current collector, the positive electrode active material including an active material capable of reversibly deintercalating and intercalating sodium ions, and the negative electrode plate includes a negative electrode current collector, the negative electrode current collector including a metal substrate;

where a constituent material of the metal substrate includes element aluminum, and a mass percentage of the element aluminum is greater than a mass percentage of each of other elements.

In related technologies, lithium-ion batteries use copper foil, which has good conductivity and is not prone to oxidation or alloying reactions with lithium at low potentials, as a negative electrode current collector. In sodium-ion systems, considering that aluminum does not undergo alloying reactions with sodium at low potentials and aluminum is cost-effective, it can replace copper foil to form a substrate of a negative electrode current collector. Therefore, an aluminum alloy or metallic aluminum with a mass percentage of element aluminum greater than a mass percentage of any other element can be selected as a metal substrate of a negative electrode current collector, thereby reducing cost and weight.

In some embodiments, the battery cell further includes:

a housing having a chamber for accommodating the electrode assembly; and a negative electrode lead-out portion disposed on the housing, where the negative electrode lead-out portion is configured to electrically connect the metal substrate and a conductor outside the battery cell.

The negative electrode lead-out portion is disposed to electrically connect the metal substrate of the negative electrode plate and the conductor outside the battery cell, implementing conduction between internal and external components of the battery to satisfy charging and discharging functions of the battery.

In some embodiments, the negative electrode lead-out portion is an integrally formed structure, and a constituent material of the negative electrode lead-out portion includes element aluminum, a mass percentage of the element aluminum being greater than a mass percentage of each of other elements.

For the negative electrode lead-out portion having an integrally formed structure, its overall constituent material includes element aluminum, a mass percentage of the element aluminum being greater than a mass percentage of each of other elements. The battery cell uses the negative electrode lead-out portion to implement electrical connection between the negative electrode current collector and an external conductor. Compared to related technologies that copper foil is used as a negative electrode current collector and a complex copper-aluminum composite pole needs to be designed for welding with the copper foil and aluminum busbar component on the inner and outer sides of the battery cell, such negative electrode lead-out portion with aluminum as a primary element can be electrically connected to an aluminum negative electrode current collector and a busbar component made of pure aluminum or aluminum alloy, such as an aluminum busbar. This not only improves connection reliability of fixed connection methods such as welding, but also further simplifies a structure of the negative electrode lead-out portion, reducing processing complexity and cost.

In some embodiments, a constituent material of the metal substrate and a constituent material of the negative electrode lead-out portion each include element aluminum with a mass percentage greater than or equal to 90%.

The constituent material of the metal substrate of the negative electrode current collector and the constituent material of the negative electrode lead-out portion each include an aluminum alloy material or pure aluminum material with a mass percentage of element aluminum greater than or equal to 90%, so as to achieve good conductivity and reduce weight. Additionally, since both constituent materials contain a high content of element aluminum, reliable connection effects are more easily achieved during connection processes such as welding.

In some embodiments, the negative electrode lead-out portion is a split structure, and the negative electrode lead-out portion includes a negative electrode internal connection portion and a negative electrode external connection portion fixedly connected, where the negative electrode internal connection portion is electrically connected to the metal substrate, the negative electrode external connection portion is configured to be connected to a conductor outside the battery cell, and a constituent material of the negative electrode internal connection portion and a constituent material of the negative electrode external connection portion each include element aluminum, a mass percentage of the element aluminum being greater than a mass percentage of each of other elements.

The negative electrode lead-out portion uses the fixedly connected negative electrode internal connection portion and negative electrode external connection portion, both having a constituent material including element aluminum with a mass percentage greater than that of any other element, to implement electrical connection to the negative electrode current collector, and is configured to be connected to an external conductor. Compared to related technologies that copper foil is used as a negative electrode current collector and a complex copper-aluminum composite pole needs to be designed for welding with the copper foil and aluminum busbar component on the inner and outer sides of the battery cell, such negative electrode lead-out portion is electrically connected to an aluminum negative electrode current collector and a busbar component made of pure aluminum or aluminum alloy, such as an aluminum busbar, through the negative electrode internal connection portion and the negative electrode external connection portion with aluminum as a primary element. This not only improves connection reliability of fixed connection methods such as welding, but also further simplifies a structure of the negative electrode lead-out portion, reducing processing complexity and cost.

In some embodiments, the constituent material of the metal substrate, the constituent material of the negative electrode internal connection portion, and the constituent material of the negative electrode external connection portion each include element aluminum with a mass percentage greater than or equal to 90%.

The constituent material of the metal substrate of the negative electrode current collector and the constituent material of the negative electrode lead-out portion each include an aluminum alloy material or pure aluminum material with a mass percentage of element aluminum greater than or equal to 90%, so as to achieve good conductivity and reduce weight. Additionally, since both constituent materials contain a high content of element aluminum, reliable connection effects are more easily achieved during connection processes such as welding.

In some embodiments, the battery cell further includes:
a negative electrode adapter electrically connecting the metal substrate and the negative electrode lead-out portion;
where a constituent material of the negative electrode adapter includes element aluminum, and a mass percentage of the element aluminum is greater than a mass percentage of each of other elements.

The negative electrode adapter is disposed to implement connection between the metal substrate of the negative electrode current collector and the negative electrode lead-out portion. Since the constituent material of the metal substrate and the constituent material of the negative electrode lead-out portion each include element aluminum with a mass percentage greater than that of any other element, connection reliability of fixed connection such as welding between the negative electrode adapter and the metal substrate and the negative electrode lead-out portion can be improved. Additionally, a structure of the negative electrode adapter portion is simplified, reducing processing complexity and cost.

In some embodiments, the constituent material of the negative electrode adapter includes element aluminum with a mass percentage greater than or equal to 90%.

The constituent material of the metal substrate of the negative electrode current collector, the constituent material of the negative electrode adapter, and the constituent material of the negative electrode lead-out portion each include an aluminum alloy material or pure aluminum material with a mass percentage of element aluminum greater than or equal to 90%, so as to achieve good conductivity and reduce weight. Additionally, since all three constituent materials contain a high content of element aluminum, reliable connection effects are more easily achieved during connection processes such as welding.

In some embodiments, the negative electrode current collector is constituted by the metal substrate, and the constituent material of the metal substrate includes element aluminum with a mass percentage greater than or equal to 99%.

The negative electrode current collector, entirely constituted by a material including element aluminum with a mass percentage greater than or equal to 99%, is equivalent to a negative electrode current collector in a form of pure aluminum foil or close to pure aluminum foil, which can achieve good conductivity, strong plasticity, and ductility, thereby facilitating forming processes such as winding and adapting to swelling of the electrode assembly during charging.

In some embodiments, the negative electrode current collector further includes a first insulating material layer, the metal substrates are disposed on two sides of the first insulating material layer along a thickness direction, and the constituent material of the metal substrate includes element aluminum with a mass percentage greater than or equal to 99%.

The negative electrode current collector adopts a layered composite structure, and the metal substrates, constituted by a material including element aluminum with a mass percentage greater than or equal to 99%, are disposed on two side surfaces of the first insulating material layer. This not only achieves good conductivity and strong plasticity, but also further reduces weight and improves ductility and strength of the negative electrode current collector.

In some embodiments, the battery cell further includes:
a housing having a chamber for accommodating the electrode assembly; and
a positive electrode lead-out portion disposed on the housing, configured to electrically connect the positive electrode current collector and a conductor outside the battery cell;
where a constituent material of the positive electrode lead-out portion includes element aluminum, and a mass percentage of the element aluminum is greater than a mass percentage of each of other elements.

The positive electrode lead-out portion, with a constituent material including element aluminum with a mass percentage greater than that of any other element, is used to implement electrical connection to the positive electrode current collector and can be configured to be connected to an external conductor. The positive electrode lead-out portion, with aluminum as a primary element, is electrically connected to an aluminum positive electrode current collector or a busbar component made of pure aluminum or aluminum alloy, such as an aluminum busbar. This not only improves connection reliability of fixed connection methods such as welding, but also further simplifies a structure of the positive electrode lead-out portion, reducing processing complexity and cost.

In some embodiments, the constituent material of the positive electrode lead-out portion includes element aluminum with a mass percentage greater than or equal to 90%.

The constituent material of the positive electrode lead-out portion includes an aluminum alloy material or pure aluminum material with a mass percentage of element aluminum greater than or equal to 90%, facilitating reliable connection effects during connection processes such as welding. Additionally, the positive electrode lead-out portion has good conductivity and low weight.

In some embodiments, the battery cell further includes:
a positive electrode adapter electrically connected to the positive electrode lead-out portion and the positive electrode current collector;
where a constituent material of the positive electrode adapter includes element aluminum, and a mass percentage of the element aluminum is greater than a mass percentage of each of other elements.

The positive electrode adapter is disposed to connect the positive electrode adapter to the positive electrode current collector and the positive electrode lead-out portion. Since the constituent material of the positive electrode adapter and the constituent material of the positive electrode lead-out portion each include element aluminum with a mass percentage greater than that of any other element, connection reliability of fixed connection such as welding between the positive electrode adapter and the positive electrode lead-out portion can be improved. Additionally, a structure of the positive electrode adapter portion is simplified, reducing processing complexity and cost.

In some embodiments, the constituent material of the positive electrode adapter includes element aluminum with a mass percentage greater than or equal to 90%.

The constituent material of the positive electrode adapter and the constituent material of the positive electrode lead-out portion each can include an aluminum alloy material or pure aluminum material with a mass percentage of element aluminum greater than or equal to 90%, so as to achieve good conductivity and reduce weight. Additionally, since the constituent materials of both the positive electrode adapter and the positive electrode lead-out portion contain a high content of element aluminum, reliable connection effects are more easily achieved during connection processes such as welding.

In some embodiments, the positive electrode current collector is a metal current collector, and a constituent material of the metal current collector includes element aluminum with a mass percentage greater than or equal to 99%.

The positive electrode current collector, entirely constituted by a material including element aluminum with a mass percentage greater than or equal to 99%, is equivalent to a metal current collector in a form of pure aluminum foil or close to pure aluminum foil, which can achieve good conductivity and strong plasticity, thereby facilitating forming processes such as winding and adapting to swelling of the electrode assembly during charging. Additionally, the metal current collector can be more easily connected to the positive electrode lead-out portion without using a dissimilar metal composite structure, simplifying the battery structure.

In some embodiments, the positive electrode current collector includes: a second insulating material layer and conductive layers located on two sides of the second insulating material layer in a thickness direction of the second insulating material layer, and a constituent material of the conductive layer includes element aluminum with a mass percentage greater than or equal to 99%.

The positive electrode current collector adopts a layered composite structure, and the conductive layers, constituted by a material including element aluminum with a mass percentage greater than or equal to 99%, are disposed on two side surfaces of the second insulating material layer, which can achieve good conductivity and strong plasticity, and further reduce weight and improve ductility and strength of the positive electrode current collector. Additionally, such conductive layers can be more easily connected to the positive electrode lead-out portion without using a dissimilar metal composite structure, simplifying the battery structure.

In some embodiments, the housing includes a casing and a top cover, one end of the casing has an end opening, and the top cover covers and is fixed to the end opening;

where the top cover serving as the negative electrode lead-out portion is electrically connected to the metal substrate and configured to be connected to a conductor outside the battery cell; and a casing wall of the casing serving as the positive electrode lead-out portion is electrically connected to the positive electrode current collector and configured to be connected to a conductor outside the battery cell; or the top cover serving as the positive electrode lead-out portion is electrically connected to the positive electrode current collector and configured to be connected to a conductor outside the battery cell; and a casing wall of the casing serving as the negative electrode lead-out portion is electrically connected to the metal substrate and configured to be connected to a conductor outside the battery cell.

For the negative electrode lead-out portion having an integrally formed structure, using the top cover as the negative electrode lead-out portion to electrically connect to the metal substrate and the external conductor provides a larger electrical connection area for the negative electrode lead-out portion, reducing internal resistance. Moreover, the structure is simpler with less space occupation, facilitating further improvement in battery capacity. Using a casing wall of the casing as the positive electrode lead-out portion to connect to the positive electrode current collector and the external conductor provides a larger electrical connection area for the positive electrode lead-out portion, reducing internal resistance and facilitating connection to the external conductor.

Similarly, for the negative electrode lead-out portion having an integrally formed structure, using a casing wall of the casing as the negative electrode lead-out portion to electrically connect to the metal substrate and the external conductor provides a larger electrical connection area for the negative electrode lead-out portion, reducing internal resistance. Moreover, the structure is simpler with less space occupation, facilitating further improvement in battery capacity. Using the top cover as the positive electrode lead-out portion to connect to the positive electrode current collector and the external conductor provides a larger electrical connection area for the positive electrode lead-out portion, reducing internal resistance and facilitating connection to the external conductor.

In some embodiments, the housing includes a casing, a first top cover, and a second top cover, two opposite ends of the casing each have an end opening, and the first top cover and the second top cover respectively cover and are fixed to the end openings at the two opposite ends of the casing;

where the first top cover serving as the negative electrode lead-out portion is electrically connected to the metal substrate and configured to be connected to a conductor outside the battery cell; and the second top cover serving as the positive electrode lead-out portion is electrically connected to the positive electrode current collector and configured to be connected to a conductor outside the battery cell; or the second top cover serving as the negative electrode lead-out portion is electrically connected to the metal substrate and configured to be connected to a conductor outside the battery cell; and the first top cover serving as the positive electrode lead-out portion is electrically connected to the positive electrode current collector and configured to be connected to a conductor outside the battery cell.

For the negative electrode lead-out portion having an integrally formed structure, using the first top cover as the negative electrode lead-out portion to electrically connect to the metal substrate and the external conductor provides a larger electrical connection area for the negative electrode lead-out portion, reducing internal resistance. Moreover, the structure is simpler with less space occupation, facilitating further improvement in battery capacity. Using the second top cover as the positive electrode lead-out portion to connect to the positive electrode current collector and the external conductor provides a larger electrical connection area for the positive electrode lead-out portion, reducing internal resistance and facilitating connection to the external conductor.

Similarly, for the negative electrode lead-out portion having an integrally formed structure, using the second top cover as the negative electrode lead-out portion to electrically connect to the metal substrate and the external conductor provides a larger electrical connection area for the negative electrode lead-out portion, reducing internal resistance. Moreover, the structure is simpler with less space occupation, facilitating further improvement in battery capacity. Using the first top cover as the positive electrode lead-out portion to connect to the positive electrode current collector and the external conductor provides a larger electrical connection area for the positive electrode lead-out portion, reducing internal resistance and facilitating connection to the external conductor.

In some embodiments, the positive electrode active material includes at least one of sodium-containing layered transition metal oxide, sodium-containing phosphate, and Prussian blue analogue.

Using a positive electrode active material including at least one of sodium-containing layered transition metal oxide, sodium-containing phosphate, and Prussian blue analogue allows for reversible deintercalation and intercalation of sodium ions.

According to an aspect of the present disclosure, a battery is provided, including the foregoing battery cell.

A battery using the foregoing battery cell can reduce weight and cost.

In some embodiments, the battery includes a plurality of the battery cells and further includes a busbar component configured to electrically connect the plurality of the battery cells, and a constituent material of the busbar component includes element aluminum with a mass percentage greater than that of any other element.

The busbar component with a constituent material including element aluminum with a mass percentage greater than that of any other element is used to implement electrical connection of the plurality of the foregoing battery cells, allowing the busbar component to be more easily and reliably welded with the negative electrode lead-out portion having a constituent material including element aluminum with a mass percentage greater than that of any other element.

In some embodiments, the constituent material of the busbar component includes element aluminum with a mass percentage greater than or equal to 90%.

The constituent material of the busbar component includes an aluminum alloy material or pure aluminum material with a mass percentage of element aluminum greater than or equal to 90%, facilitating reliable connection effects during connection processes such as welding.

According to an aspect of the present disclosure, an electric apparatus is provided, including: the foregoing battery.

An electric apparatus using the foregoing battery can reduce weight and cost.

BRIEF DESCRIPTION OF DRAWINGS

To more clearly illustrate technical solutions of embodiments of the present disclosure, drawings required for use in the embodiments of the present disclosure are briefly introduced below. It is apparent that the drawings described below are merely some embodiments of the present disclosure, and for a person of ordinary skill in the art, other drawings can be obtained based on the drawings without creative efforts.

With reference to the accompanying drawings, the present disclosure can be more clearly understood based on the following detailed descriptions.

Figure 1:
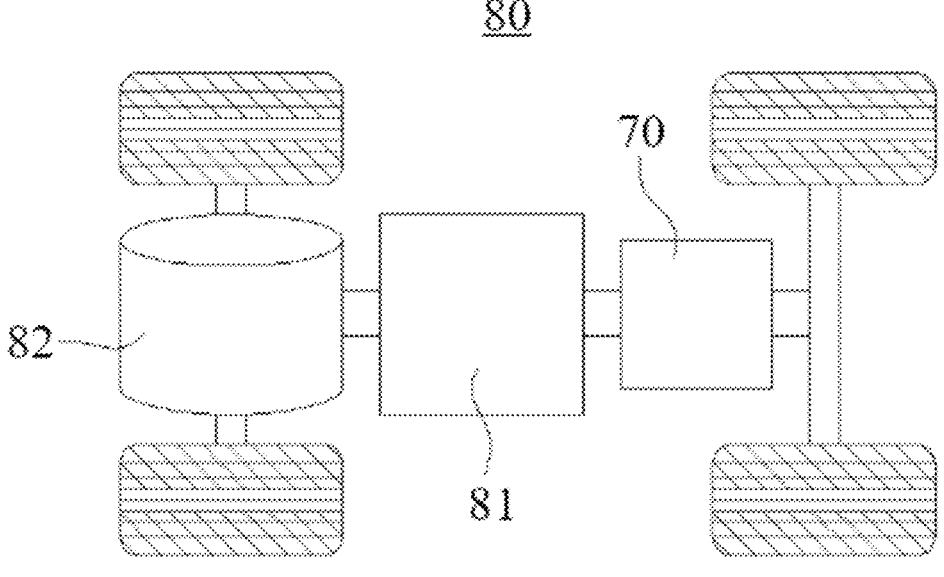
FIG. 1 is a schematic structural diagram of an electric apparatus according to some embodiments of the present disclosure.

It should be understood that sizes of various parts shown in the accompanying drawings are not drawn to scale. Additionally, identical or similar reference signs indicate identical or similar components.

DESCRIPTION OF REFERENCE SIGNS 10. electrode assembly; 11. positive electrode plate; 111. positive electrode current collector; 111$i$. second insulating material layer; 111$c$. conductive layer; 112. positive electrode active material; 12. negative electrode plate; 121. negative electrode current collector; 121$b$. metal substrate; 121$i$. first insulating material layer; 13. separator;

20. housing; 21. casing; 22. top cover; 22$a$. first top cover; 22$b$. second top cover;

30. negative electrode lead-out portion; 31. negative electrode internal connection portion; 32. negative electrode external connection portion;

40. negative electrode adapter;

50. positive electrode lead-out portion; 51. positive electrode internal connection portion; 52. positive electrode external connection portion;

60. positive electrode adapter;

70. battery; 71. battery cell; 72. busbar component; 73. box body; 74. box cover;

80. vehicle; 81. controller; and 82. motor.

DESCRIPTION OF EMBODIMENTS

The embodiments of the present disclosure are further described in detail below with reference to the accompanying drawings and embodiments. The detailed description and accompanying drawings of the following embodiments are used to exemplarily illustrate the principles of the present disclosure rather than to limit the scope of the present disclosure, that is, the present disclosure is not limited to the described embodiments.

In the description of the present disclosure, it should be noted that, unless otherwise specified, "a plurality" means two or more; terms such as "upper", "lower", "left", "right", "inner", and "outer" indicating orientation or positional relationships are only for convenience of describing the present disclosure and simplifying the description, and do not indicate or imply that the referred device or element must have a specific orientation, be constructed, and operated in a specific orientation, and thus should not be construed as limiting the present disclosure. Additionally, terms such as "first", "second", "third", and the like are merely for descriptive purposes and should not be understood as indicating or implying relative importance. "Vertical" is not strictly vertical but within an allowable range of error. "Parallel" is not strictly parallel but within an allowable range of error.

Orientation terms appearing in the following description are directions shown in the drawings and do not limit the specific structure of the present disclosure. In the description of the present disclosure, it should also be noted that, unless otherwise clearly specified and limited, terms such as "mounted", "connected", and "connection" should be understood in a broad sense, for example, it can be a fixed connection, a detachable connection, or an integral connection; it can be a direct connection or an indirect connection through an intermediate medium. Persons of ordinary skill in the art can understand specific meanings of the foregoing terms in the present disclosure as appropriate to specific situations.

Some embodiments of the present disclosure are described in detail below with reference to the accompanying drawings. Features in the embodiments described below can be combined with each other without conflict.

In the present disclosure, "a plurality" refers to two or more (including two).

In embodiments of the present disclosure, a battery cell may be a secondary battery. The secondary battery refers to a battery cell that can be recharged to activate an active material for continued use after discharge.

In related technologies, lithium-ion batteries use copper foil, which has good conductivity and is not prone to oxidation or alloying reactions with Li at low potentials, as a negative electrode current collector. For sodium-ion system-based batteries that continue to use copper foil, material costs need further reduction.

In view of this, embodiments of the present disclosure provide a battery cell, a battery, and an electric apparatus, so as to reduce material costs of the battery cell.

According to an aspect of the present disclosure, a battery cell is provided, including: an electrode assembly. The electrode assembly includes a positive electrode plate and a negative electrode plate, where the positive electrode plate includes a positive electrode current collector and a positive electrode active material disposed on the positive electrode current collector, the positive electrode active material including an active material capable of reversibly deintercalating and intercalating sodium ions, and the negative electrode plate includes a negative electrode current collector, the negative electrode current collector including a metal substrate; where a constituent material of the metal substrate includes element aluminum, and a mass percentage of the element aluminum is greater than a mass percentage of each of other elements.

In related technologies, lithium-ion batteries use copper foil, which has good conductivity and is not prone to oxidation or alloying reactions with Li at low potentials, as a negative electrode current collector. In contrast, in sodium-ion systems, sodium does not undergo alloying reactions with aluminum at low potentials and aluminum is cost-effective. Therefore, an aluminum alloy or metallic aluminum with a mass percentage of element aluminum greater than a mass percentage of any other element can be selected to replace copper foil as a metal substrate of a negative electrode current collector, thereby reducing cost and weight.

FIG. 1 is a schematic structural diagram of an electric apparatus according to some embodiments of the present disclosure. For ease of description, an electric apparatus being a vehicle is used as an example for description. A vehicle 80 may be a fossil fuel vehicle, a natural-gas vehicle, or a new energy vehicle. The new energy vehicle may be a battery electric vehicle, a hybrid electric vehicle, or the like. A battery 70 may be disposed at a bottom, front, or rear of the vehicle 80.

The battery 70 may be configured to supply power to the vehicle 80. For example, the battery 70 may be used as an operational power source for the vehicle 80 for use in a circuit system of the vehicle 80, for example, to satisfy power needs of start, navigation, and running of the vehicle 80. The battery 70 can be used not only as the operational power source for the vehicle 80 but also as a driving power source for the vehicle 80, replacing or partially replacing fossil fuel or natural gas to provide driving traction for the vehicle 80.

The vehicle 80 may further include an axle, wheels, a motor 82, and a controller 81 internally. The controller 81 is configured to control the battery 70 to supply power to the motor 82. For example, when the vehicle 80 uses the battery 70 as a driving power source, the controller 81 can provide the motor 82 with power required for constant speed or acceleration. The motor 82 is configured to drive the axle to rotate, thereby driving the wheels to rotate.

Figure 2:
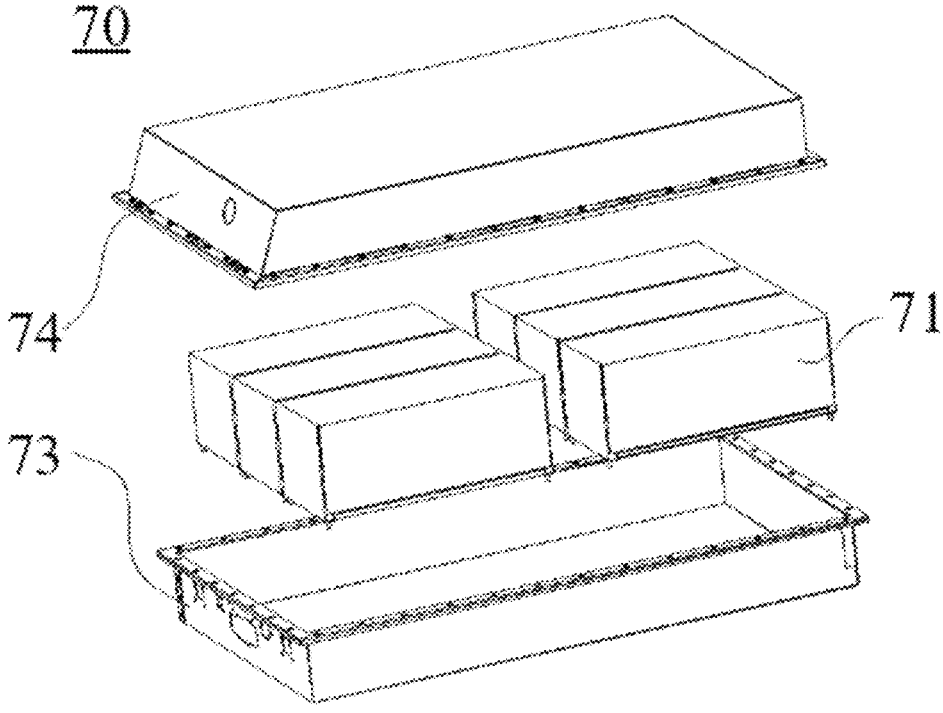
FIG. 2 is a schematic exploded view of a battery according to some embodiments of the present disclosure.
Figure 3:
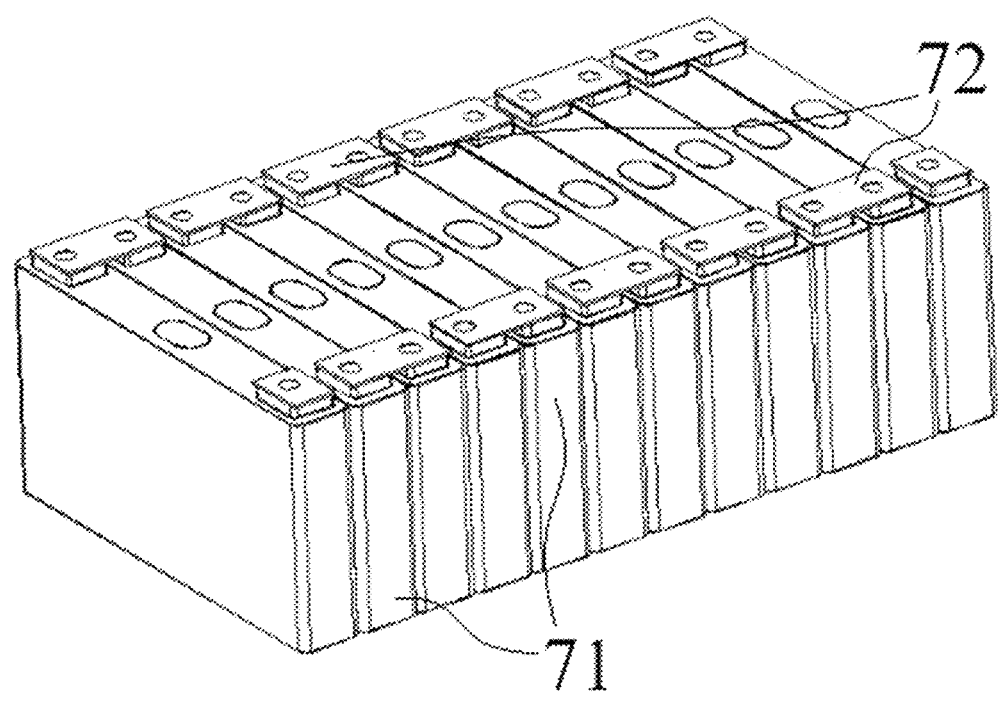
FIG. 3 is a schematic diagram of connection of a plurality of battery cells in some embodiments of a battery according to the present disclosure.

FIG. 2 is a schematic exploded view of a battery according to some embodiments of the present disclosure. FIG. 3 is a schematic diagram of connection of a plurality of battery cells in some embodiments of a battery according to the present disclosure. Referring to FIG. 2 and FIG. 3, in some embodiments, the battery 70 includes a battery box and a plurality of battery cells 71 disposed within the battery box. The battery box can provide functions such as accommodation, support, cooling, sealing, and impact resistance for the battery cells 71, and can also prevent external liquids or other foreign objects from adversely affecting charging, discharging, or safety of the battery cells. The battery box may include a box body 73 and a box cover 74 engaged with the box body 73.

Referring to FIG. 3, the battery cells 71 may be electrically connected through a busbar component 72, for example, in series, parallel, or series-parallel, to implement required electrical performance parameters of the battery 70. The plurality of battery cells 71 are arranged in rows. One or more rows of battery cells 71 may be provided in the box body as needed.

In some embodiments, the battery cells 71 of the battery 70 may be arranged along at least one of a length direction and a width direction of the battery box. At least one row or one column of battery cells 71 may be provided as needed. One or more layers of battery cells 71 may also be arranged along a height direction of the battery 70 as needed.

In some embodiments, a plurality of battery cells 71 may first be connected in series, parallel, or series-parallel to form a battery module, and then a plurality of battery modules may be connected in series, parallel, or series-parallel to form an entirety which is accommodated within the battery box. In some other embodiments, all battery cells 71 are directly connected in series, parallel, or series-parallel, and an entirety formed by all the battery cells 71 is accommodated within the battery box.

Figure 4:
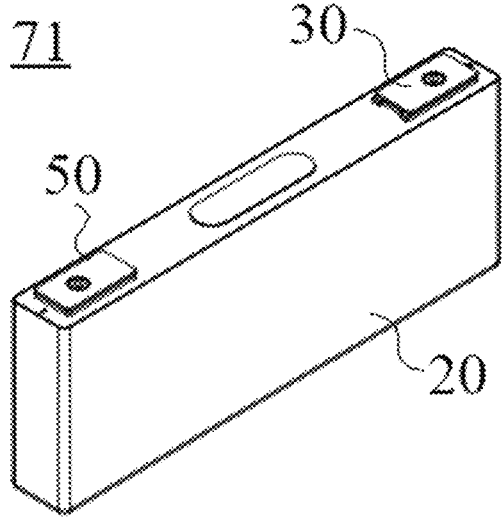
FIG. 4 is a schematic structural diagram of a battery cell according to some embodiments of the present disclosure.
Figure 5:
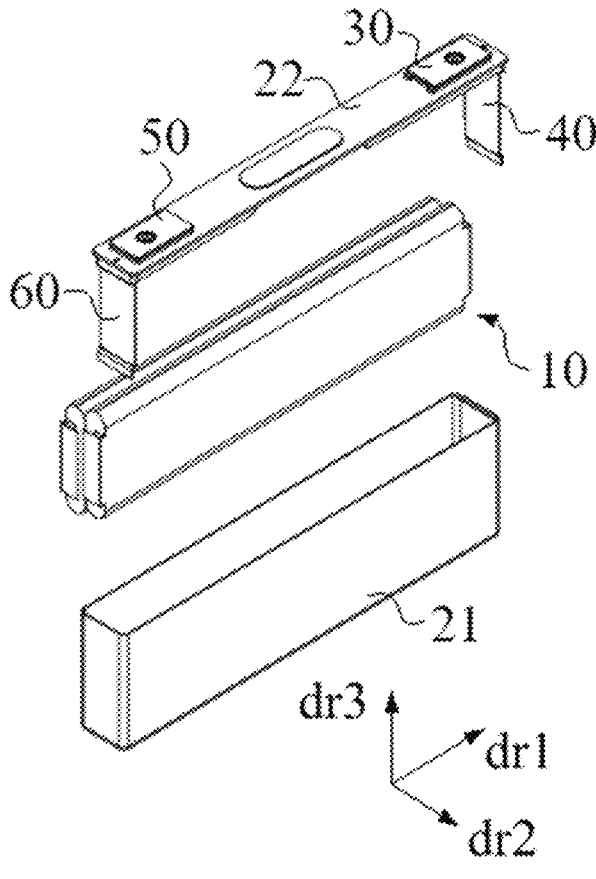
FIG. 5 is a schematic exploded view of the embodiment shown in FIG. 4.
Figure 6:
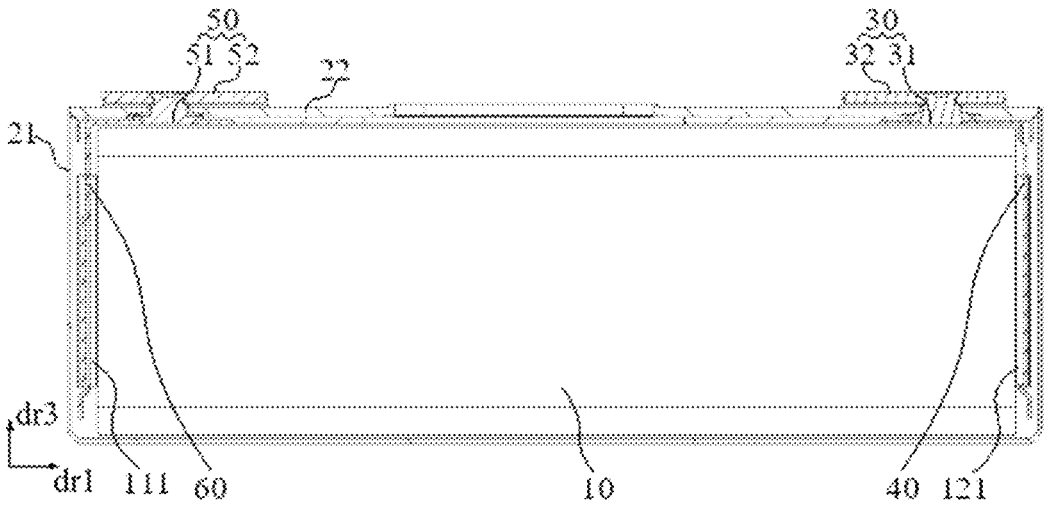
FIG. 6 is a schematic cross-sectional view of the embodiment shown in FIG. 4.
Figure 7:
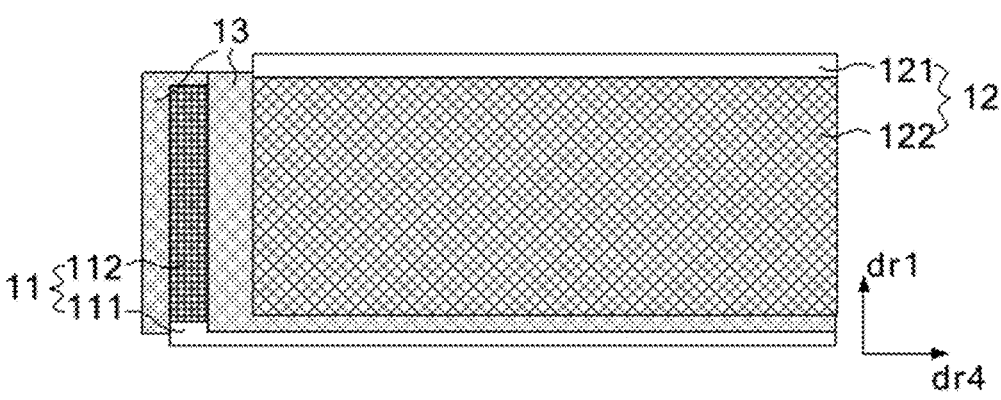
FIG. 7 is a schematic diagram of arrangement of a positive electrode plate, a negative electrode plate, and a separator included in an electrode assembly in some embodiments of a battery cell according to the present disclosure.

FIG. 4 is a schematic structural diagram of a battery cell according to some embodiments of the present disclosure. FIG. 5 is a schematic exploded view of the embodiment shown in FIG. 4. FIG. 6 is a schematic cross-sectional view of the embodiment shown in FIG. 4. FIG. 7 is a schematic diagram of arrangement of a positive electrode plate, a negative electrode plate, and a separator included in an electrode assembly in some embodiments of a battery cell according to the present disclosure.

Referring to FIG. 4 to FIG. 6, some embodiments of the present disclosure provide a battery cell 71 including an electrode assembly 10. Referring to FIG. 7, the electrode assembly 10 includes a positive electrode plate 11 and a negative electrode plate 12, where the positive electrode plate 11 includes a positive electrode current collector 111 and a positive electrode active material 112 disposed on the positive electrode current collector 111, the positive electrode active material 112 including an active material capable of reversibly deintercalating and intercalating sodium ions, and the negative electrode plate 12 includes a negative electrode current collector 121, the negative electrode current collector 121 including a metal substrate 121*b*. A constituent material of the metal substrate 121*b* includes element aluminum, and a mass percentage of the element aluminum is greater than a mass percentage of each of other elements.

In this embodiment, elements other than aluminum in the constituent material of the metal substrate may include one or more of copper, manganese, silicon, magnesium, zinc, nickel, iron, titanium, chromium, zirconium, cobalt, and rare earth elements, and may also include elements as impurities.

In sodium-ion systems, aluminum does not undergo alloying reactions with sodium at low potentials, and aluminum is cost-effective. An aluminum alloy or metallic aluminum with a mass percentage of element aluminum greater than that of any other element is selected as the metal substrate 121*b* of the negative electrode current collector 121, thereby forming a substrate of the negative electrode current collector 121 in place of copper foil. This can reduce the material cost and weight of the battery cell.

The mass percentage of element aluminum can be measured using a spectrometer, for example, by measuring a mass percentage of element aluminum in a sample using a direct-reading spectrometer (direct-reading spectrometer). In one measurement example, a sample was placed on an excitation platform of a photoelectric direct-reading spectrometer, and a surface to be tested of the sample was polished. The spectrometer was started to excite the sample one or more times. After the sample was excited by an excitation light source on the excitation platform, characteristic spectra of various elements were generated through a condenser lens and a linear motor, and spectral lines of various elements were automatically arranged by a grating spectroscope, directed through an exit slit to illuminate a photomultiplier tube, and then converted into photocurrent by the photomultiplier tube. Finally, based on a relationship between photocurrent, spectral intensity of the elements, and content of the elements, the content of the elements to be tested was obtained through data processing.

The positive electrode current collector 111 has two opposite surfaces in its thickness direction, and the positive electrode active material 112 is disposed on either or both of the two opposite surfaces of the positive electrode current collector 111. In some embodiments, the positive electrode current collector may be in the form of a metal foil or a composite current collector.

In this embodiment, the positive electrode active material may be a well-known active material capable of reversibly deintercalating and intercalating sodium ions in sodium-ion systems.

In some embodiments, the positive electrode active material 112 includes at least one of sodium-containing layered transition metal oxide, sodium-containing phosphate, and Prussian blue analogue.

Optionally, the sodium-containing layered transition metal oxide includes a substance with a general formula of $Na_fMg_gFe_hO_2$, where M includes at least one of transition metal elements, $0.67 < f < 1.1$, $0.5 < g < 1$, and $0 < h < 0.5$. For example, the sodium-containing layered transition metal oxide may be $Na_{0.88}Cu_{0.24}Fe_{0.29}Mn_{0.47}O_2$.

Optionally, the sodium-containing phosphate includes a substance with a general formula of $Na_eMe_c(PO_4)_dO_2X$, where Me includes at least one of transition metal elements, X includes at least one of halogen elements, $0<e\leq4$, $0<c\leq2$, and $1\leq d\leq3$. In some embodiments, the sodium-containing phosphate may be $Na_3V_2(PO_4)_2O_2F$.

Optionally, the Prussian blue analogue includes a substance with a general formula of $Na_xP[R(CN)_6]\delta\cdot zH_2O$, where P and R each independently include at least one of transition metal elements, $0<x\leq2$, $0<\delta\leq1$, and $0\leq z\leq10$. In some embodiments, the Prussian blue analogue may be $Na_2Ni_{0.17}Co_{0.83}Fe(CN)_6$.

Optionally, the transition metal element includes at least one of Ti, Cr, Mn, Fe, Co, Ni, V, Cu, and Zn.

Optionally, the halogen element includes at least one of F, Cl, and Br.

In some embodiments, the positive electrode active material may be dispersed with a conductive agent, a binder, and any other components in a solvent to produce a positive electrode slurry to be applied on a surface of the positive electrode current collector. In an example, the binder may include at least one of polyvinylidene fluoride, polytetrafluoroethylene, vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin. In an example, the conductive agent may include at least one of superconducting carbon, acetylene black, carbon black, Ketjen black, carbon dots, carbon nanotubes, graphene, and carbon nanofibers.

Referring to FIG. 7, the negative electrode plate 12 includes a negative electrode current collector 121 and a negative electrode active material disposed on at least one surface of the negative electrode current collector 121. In an example, the negative electrode current collector has two opposite surfaces in its thickness direction, and the negative electrode active material is disposed on either or both of the two opposite surfaces of the negative electrode current collector. In some other embodiments, no negative electrode active material is disposed on the negative electrode current collector.

In some embodiments, the negative electrode current collector may be a metal foil or a composite current collector.

In some embodiments, the negative electrode active material may be a well-known negative electrode active material used for batteries in the art. For example, the negative electrode active material may include at least one of the following materials: artificial graphite, natural graphite, soft carbon, hard carbon, silicon-based material, tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, the present disclosure is not limited to these materials, but may also use other conventional materials that can be used as negative electrode active materials for batteries. These negative electrode active materials may be used alone or in combination of two or more.

Referring to FIG. 5 and FIG. 6, in some embodiments, the battery cell 71 further includes: a housing 20 and a negative electrode lead-out portion 30. The housing 20 has a chamber for accommodating the electrode assembly 10. The negative electrode lead-out portion 30 is disposed on the housing 20. The negative electrode lead-out portion 30 is configured to electrically connect the metal substrate 121b and a conductor outside the battery cell 71.

The conductor outside the battery cell 71 may be a conductive portion of an electric apparatus or a conductive portion of a charging apparatus. Optionally, the external conductor may be a busbar component configured to electrically connect a plurality of battery cells. The negative electrode lead-out portion is disposed to electrically connect the metal substrate of the negative electrode plate and a conductor outside the battery cell, implementing conduction between components inside and outside the battery to satisfy charging and discharging functions of the battery.

In some related-art lithium-ion batteries, positive and negative electrode current collectors use aluminum and copper, respectively. When such lithium-ion battery cell is connected to a pole through a busbar component (for example, an aluminum busbar), considering the difficulty of copper-aluminum welding (mainly due to a large difference in their melting points, copper at 1083.4° C. and aluminum at 660° C.), a copper-aluminum composite pole structure is typically used. To be specific, a copper pole portion of the copper-aluminum composite pole is connected to a copper negative electrode current collector, and an aluminum pole portion is welded to an aluminum busbar, so as to ensure reliable electrical connection. However, such copper-aluminum composite structure involves relatively complex processing and high costs. Additionally, electrochemical reactions may take place at the copper-aluminum junction, leading to increased resistance at the contact position.

Referring to FIG. 6, in some embodiments, the negative electrode lead-out portion 30 is a split structure, and the negative electrode lead-out portion 30 includes a negative electrode internal connection portion 31 and a negative electrode external connection portion 32 fixedly connected, where the negative electrode internal connection portion 31 is electrically connected to the metal substrate 121b, the negative electrode external connection portion 32 is configured to be connected to a conductor outside the battery cell 71, and a constituent material of the negative electrode internal connection portion 31 and a constituent material of the negative electrode external connection portion 32 each include element aluminum, a mass percentage of the element aluminum being greater than a mass percentage of each of other elements.

In this embodiment, elements other than aluminum in the constituent material of the negative electrode internal connection portion and the constituent material of the negative electrode external connection portion may include one or more of copper, manganese, silicon, magnesium, zinc, nickel, iron, titanium, chromium, zirconium, cobalt, and rare earth elements, and may also include elements as impurities.

The negative electrode lead-out portion 30 uses the fixedly connected negative electrode internal connection portion 31 and negative electrode external connection portion 32, both having a constituent material including element aluminum with a mass percentage greater than that of any other element, to implement electrical connection to the negative electrode current collector 121, and is configured to be connected to an external conductor. Compared to related technologies that copper foil is used as a negative electrode current collector 121 and a complex copper-aluminum composite pole needs to be designed for welding with the copper foil and aluminum busbar component 72 on the inner and outer sides of the battery cell 71, such negative electrode lead-out portion 30 is electrically connected to an aluminum negative electrode current collector 121 and a busbar component 72 made of pure aluminum or aluminum alloy, such as an aluminum busbar, through the negative electrode internal connection portion 31 and the negative electrode external connection portion 32 with aluminum as a primary element. This not only improves connection reliability of fixed connection methods such as welding, but also further simplifies a structure of the negative electrode lead-out portion 30, reducing processing complexity and cost.

For the embodiments that the negative electrode internal connection portion and the negative electrode external connection portion are integrally formed, the integrally formed negative electrode lead-out portion has good conductive performance and eliminates the operations for connecting the negative electrode internal connection portion and the negative electrode external connection portion, reducing process steps.

In some embodiments, the constituent material of the metal substrate 121b, the constituent material of the negative electrode internal connection portion 31, and the constituent material of the negative electrode external connection portion 32 each include element aluminum with a mass percentage greater than or equal to 90%.

The constituent material of the metal substrate 121b of the negative electrode current collector 121 and the constituent material of the negative electrode lead-out portion 30 each include an aluminum alloy material or pure aluminum material with a mass percentage of element aluminum greater than or equal to 90%, so as to achieve good conductivity and reduce weight. Additionally, since both constituent materials contain a high content of element aluminum, reliable connection effects are more easily achieved during connection processes such as welding.

Referring to FIG. 5 and FIG. 6, in some embodiments, the battery cell 71 further includes a negative electrode adapter 40. The negative electrode adapter 40 electrically connects the metal substrate 121b and the negative electrode lead-out portion 30. A constituent material of the negative electrode adapter 40 includes element aluminum, and a mass percentage of the element aluminum is greater than a mass percentage of each of other elements.

In this embodiment, elements other than aluminum in the constituent material of the negative electrode adapter may include one or more of copper, manganese, silicon, magnesium, zinc, nickel, iron, titanium, chromium, zirconium, cobalt, and rare earth elements, and may also include elements as impurities.

The negative electrode adapter 40 is disposed to implement connection between the metal substrate 121b of the negative electrode current collector 121 and the negative electrode lead-out portion 30. Since the constituent material of the metal substrate 121b and the constituent material of the negative electrode lead-out portion 30 each include element aluminum with a mass percentage greater than that of any other element, connection reliability of fixed connection such as welding between the negative electrode adapter 40 and the metal substrate 121b and the negative electrode lead-out portion 30 can be improved. Additionally, a structure of the negative electrode adapter portion is simplified, reducing processing complexity and cost.

In FIG. 5 and FIG. 6, the negative electrode adapter 40 may be arranged as a bent structure to facilitate welding with the negative electrode current collector 121 and the negative electrode internal connection portion 31 of the negative electrode lead-out portion 30 located in different directions of the electrode assembly. In some other embodiments, the battery cell 71 may not include the negative electrode adapter 40, and the negative electrode current collector 121 is welded with the negative electrode internal connection portion 31 of the negative electrode lead-out portion 30.

In some embodiments, the constituent material of the negative electrode adapter 40 includes element aluminum with a mass percentage greater than or equal to 90%.

The constituent material of the metal substrate 121b of the negative electrode current collector 121, the constituent material of the negative electrode adapter 40, and the constituent material of the negative electrode lead-out portion 30 each include an aluminum alloy material or pure aluminum material with a mass percentage of element aluminum greater than or equal to 90%, so as to achieve good conductivity and reduce weight. Additionally, since all three constituent materials contain a high content of element aluminum, reliable connection effects are more easily achieved during connection processes such as welding.

Figure 8:
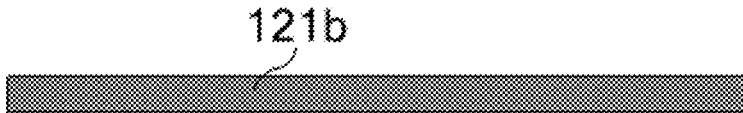
FIG. 8 is a schematic cross-sectional view of a negative electrode current collector in some embodiments of a battery cell according to the present disclosure.

FIG. 8 is a schematic cross-sectional view of a negative electrode current collector in some embodiments of a battery according to the present disclosure. Referring to FIG. 7 and FIG. 8, the negative electrode current collector 121 is constituted by the metal substrate 121b, and the constituent material of the metal substrate 121b includes element aluminum with a mass percentage greater than or equal to 99%.

The negative electrode current collector 121, entirely constituted by a material including element aluminum with a mass percentage greater than or equal to 99%, is equivalent to a negative electrode current collector 121 in a form of pure aluminum foil or close to pure aluminum foil, which can achieve good conductivity, strong plasticity, and ductility, thereby facilitating forming processes such as winding and adapting to swelling of the electrode assembly 10 during charging.

Figure 9:
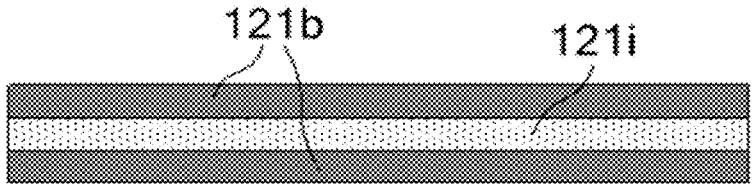
FIG. 9 is a schematic cross-sectional view of a negative electrode current collector in some other embodiments of a battery cell according to the present disclosure.

FIG. 9 is a schematic cross-sectional view of a negative electrode current collector in some other embodiments of a battery cell according to the present disclosure. Referring to FIG. 9, the negative electrode current collector 121 further includes a first insulating material layer 121i, the metal substrates 121b are disposed on two sides of the first insulating material layer 121i along a thickness direction, and the constituent material of the metal substrate 121b includes element aluminum with a mass percentage greater than or equal to 99%.

The constituent material of the first insulating material layer 121i may be a polymer material substrate, such as a substrate of polypropylene, polyethylene terephthalate, polybutylene terephthalate, polystyrene, polyethylene, or the like. The negative electrode current collector 121 adopts a layered composite structure, and the metal substrates 121b, constituted by a material including element aluminum with a mass percentage greater than or equal to 99%, are disposed on two side surfaces of the first insulating material layer 121i. This not only achieves good conductivity and strong plasticity, but also further reduces weight and improves ductility and strength of the negative electrode current collector 121.

Referring to FIG. 4 to FIG. 6, in some embodiments, the battery cell 71 further includes: a housing 20 and a positive electrode lead-out portion 50. The housing 20 has a chamber for accommodating the electrode assembly 10. The positive electrode lead-out portion 50 is disposed on the housing 20, and configured to electrically connect the positive electrode current collector 111 and a conductor outside the battery cell 71. A constituent material of the positive electrode lead-out portion 50 includes element aluminum, and a mass percentage of the element aluminum is greater than a mass percentage of each of other elements.

In this embodiment, elements other than aluminum in the constituent material of the positive electrode lead-out portion may include one or more of copper, manganese, silicon, magnesium, zinc, nickel, iron, titanium, chromium, zirconium, cobalt, and rare earth elements, and may also include elements as impurities.

The positive electrode lead-out portion, with a constituent material including element aluminum with a mass percentage greater than that of any other element, is used to implement electrical connection to the positive electrode current collector and can be configured to be connected to an external conductor. The positive electrode lead-out portion, with aluminum as a primary element, is electrically connected to an aluminum positive electrode current collector or a busbar component made of pure aluminum or aluminum alloy, such as an aluminum busbar. This not only improves connection reliability of fixed connection methods such as welding, but also further simplifies a structure of the positive electrode lead-out portion, reducing processing complexity and cost.

Referring to FIG. 6, in some embodiments, the positive electrode lead-out portion 50 is a split structure, and includes a positive electrode internal connection portion 51 and a positive electrode external connection portion 52. The positive electrode internal connection portion 51 is electrically connected to the positive electrode current collector 111. The positive electrode external connection portion 52 is configured to be connected to a conductor outside the battery cell 71. The positive electrode external connection portion 52 and the positive electrode internal connection portion 51 are integrally formed, or are in contact and electrically connected. A constituent material of the positive electrode internal connection portion 51 and a constituent material of the positive electrode external connection portion 52 each include element aluminum, and a mass percentage of the element aluminum is greater than a mass percentage of each of other elements.

In this embodiment, elements other than aluminum in the constituent material of the positive electrode internal connection portion 51 and the constituent material of the positive electrode external connection portion 52 may include one or more of copper, manganese, silicon, magnesium, zinc, nickel, iron, titanium, chromium, zirconium, cobalt, and rare earth elements, and may also include elements as impurities.

The positive electrode lead-out portion 50 uses the positive electrode internal connection portion 51 and the positive electrode external connection portion 52, both having a constituent material including element aluminum with a mass percentage greater than that of any other element, to implement electrical connection to the positive electrode current collector 111, and can be configured to be connected to an external conductor. Through the positive electrode internal connection portion 51 and the positive electrode external connection portion 52 with aluminum as a primary element, the positive electrode lead-out portion 50 is electrically connected to an aluminum positive electrode current collector 111 and a busbar component 72 made of pure aluminum or aluminum alloy, such as an aluminum busbar. This not only improves connection reliability of fixed connection methods such as welding, but also further simplifies a structure of the positive electrode lead-out portion 50, reducing processing complexity and cost.

In some embodiments, the constituent material of the positive electrode lead-out portion 50 includes element aluminum with a mass percentage greater than or equal to 90%.

The constituent material of the positive electrode lead-out portion 50 includes an aluminum alloy material or pure aluminum material with a mass percentage of element aluminum greater than or equal to 90%, facilitating reliable connection effects during connection processes such as welding. Additionally, the positive electrode lead-out portion 50 has good conductivity and lower weight.

Referring to FIG. 5 and FIG. 6, in some embodiments, the battery cell 71 further includes a positive electrode adapter 60. The positive electrode adapter 60 is electrically connected to the positive electrode lead-out portion 50 and the positive electrode current collector 111. A constituent material of the positive electrode adapter 60 includes element aluminum, and a mass percentage of the element aluminum is greater than a mass percentage of each of other elements.

In this embodiment, elements other than aluminum in the constituent material of the positive electrode adapter may include one or more of copper, manganese, silicon, magnesium, zinc, nickel, iron, titanium, chromium, zirconium, cobalt, and rare earth elements, and may also include elements as impurities.

The positive electrode adapter 60 is disposed to connect the positive electrode adapter 60 to the positive electrode current collector 111 and the positive electrode lead-out portion 50. Since the constituent material of the positive electrode adapter 60 and the constituent material of the positive electrode lead-out portion 50 each include element aluminum with a mass percentage greater than that of any other element, connection reliability of fixed connection such as welding between the positive electrode adapter 60 and the positive electrode lead-out portion 50 can be improved. Additionally, a structure of the positive electrode adapter portion is simplified, reducing processing complexity and cost.

In some embodiments, the constituent material of the positive electrode adapter 60 includes element aluminum with a mass percentage greater than or equal to 90%.

The constituent material of the positive electrode adapter 60 and the constituent material of the positive electrode lead-out portion 50 each can include an aluminum alloy material or pure aluminum material with a mass percentage of element aluminum greater than or equal to 90%, so as to achieve good conductivity and reduce weight. Additionally, since the constituent materials of both the positive electrode adapter 60 and the positive electrode lead-out portion 50 contain a high content of element aluminum, reliable connection effects are more easily achieved during connection processes such as welding.

Figure 10:
FIG. 10 is a schematic cross-sectional view of a positive electrode current collector in some embodiments of a battery cell according to the present disclosure.

FIG. 10 is a schematic cross-sectional view of a positive electrode current collector in some embodiments of a battery cell according to the present disclosure. Referring to FIG. 7 and FIG. 10, in some embodiments, the positive electrode current collector 111 is a metal current collector, and a constituent material of the metal current collector includes element aluminum with a mass percentage greater than or equal to 99%.

The positive electrode current collector 111, entirely constituted by a material including element aluminum with a mass percentage greater than or equal to 99%, is equivalent to a metal current collector in a form of pure aluminum foil or close to pure aluminum foil, which can achieve good conductivity and strong plasticity, thereby facilitating forming processes such as winding and adapting to swelling of the electrode assembly 10 during charging. Additionally, the metal current collector can be more easily connected to the positive electrode lead-out portion 50 without using a dissimilar metal composite structure, simplifying the battery structure.

Figure 11:
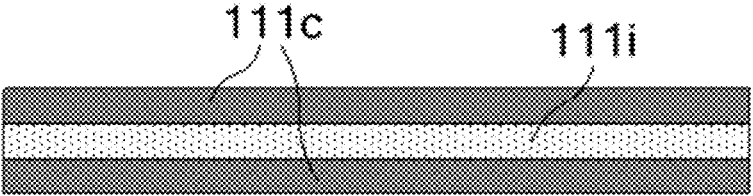
FIG. 11 is a schematic cross-sectional view of a positive electrode current collector in some other embodiments of a battery cell according to the present disclosure.

FIG. 11 is a schematic cross-sectional view of a positive electrode current collector in some other embodiments of a battery cell according to the present disclosure. Referring to FIG. 7 and FIG. 11, in some embodiments, the positive electrode current collector 111 includes: a second insulating material layer 111*i* and conductive layers 111*c* located on two sides of the second insulating material layer 111*i* in a thickness direction of the second insulating material layer 111*i*, and a constituent material of the conductive layer 111*c* includes element aluminum with a mass percentage greater than or equal to 99%.

A constituent material of the second insulating material layer 111*i* may be a polymer material substrate, such as a substrate of polypropylene, polyethylene terephthalate, polybutylene terephthalate, polystyrene, polyethylene, or the like. The positive electrode current collector 111 adopts a layered composite structure, and the conductive layers 111*c*, constituted by a material including element aluminum with a mass percentage greater than or equal to 99%, are disposed on two side surfaces of the second insulating material layer 111*i*, which can achieve good conductivity and strong plasticity, and further reduce weight and improve ductility and strength of the positive electrode current collector 111. Additionally, such conductive layers 111*c* can be more easily connected to the positive electrode lead-out portion 50 without using a dissimilar metal composite structure, simplifying the battery structure.

FIG. 3 to FIG. 6 show some embodiments of a prismatic battery cell 71. A portion of the negative electrode current collector 121 not covered by a negative electrode active material 122 (that is, a negative electrode tab) and a portion of the positive electrode current collector 111 not covered by the positive electrode active material 112 (that is, a positive electrode tab) respectively extend from two ends of the electrode assembly 10 in a first direction dr1. The negative electrode lead-out portion 30 and the positive electrode lead-out portion 50 are located on a same side of the electrode assembly 10 in a third direction dr3.

In FIG. 5, the first direction dr1 and a second direction dr2 are perpendicular, and both are perpendicular to the third direction dr3. A casing 21 of the housing 20 has an end opening on one side in the third direction dr3. The second direction dr2 is parallel to a thickness direction of the electrode assembly 10. The negative electrode tab and the positive electrode tab are located at two ends of the electrode assembly 10 along the first direction dr1.

The negative electrode lead-out portion 30 is welded to the negative electrode tab and the negative electrode internal connection portion 31 of the negative electrode lead-out portion 30 through a bent negative electrode adapter 40, and the negative electrode external connection portion 32 of the negative electrode lead-out portion 30 is located on a side of the negative electrode internal connection portion 31 far from the electrode assembly 10, and is configured to be electrically connected to an external conductor. The positive electrode lead-out portion 50 is welded to the positive electrode tab and the positive electrode internal connection portion 51 of the positive electrode lead-out portion 50 through a bent positive electrode adapter 60, and the positive electrode external connection portion 52 of the positive electrode lead-out portion 50 is located on a side of the positive electrode internal connection portion 51 far from the electrode assembly 10, and is configured to be electrically connected to an external conductor.

Figure 12:
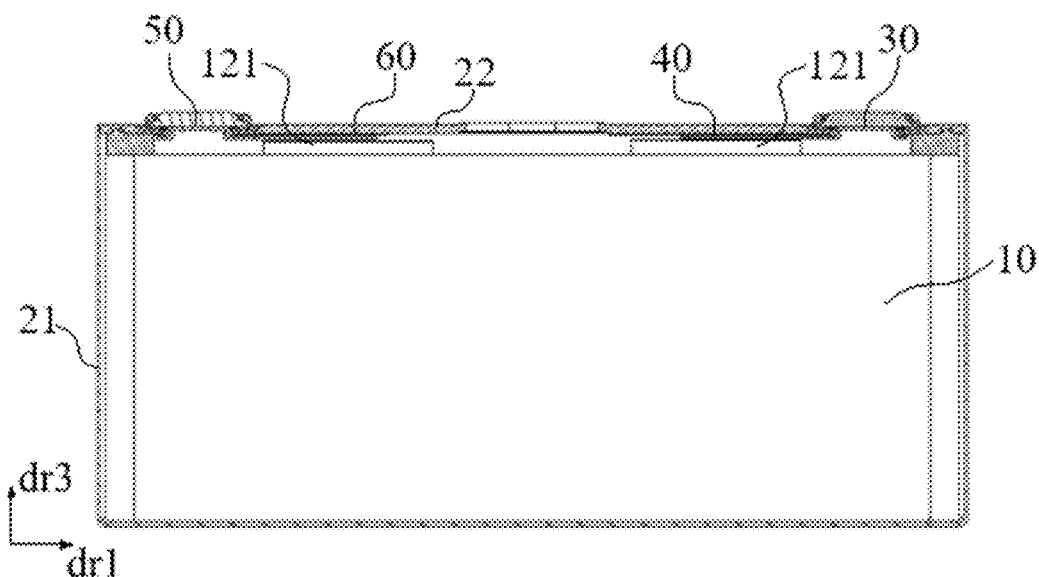
FIG. 12 is a schematic cross-sectional view of a battery cell according to some other embodiments of the present disclosure.

FIG. 12 is a schematic cross-sectional view of a battery cell according to some other embodiments of the present disclosure. FIG. 12 shows a cross-sectional structure of some other embodiments of a prismatic battery cell. A portion of the negative electrode current collector 121 not covered by a negative electrode active material 122 (that is, a negative electrode tab) and a portion of the positive electrode current collector 111 not covered by the positive electrode active material 112 (that is, a positive electrode tab) extend from a same end of the electrode assembly 10 in the third direction dr3. The negative electrode lead-out portion 30 and the positive electrode lead-out portion 50 are also both located on a same side of the electrode assembly 10 in the third direction dr3 and adjacent to the negative electrode tab and the positive electrode tab. The negative electrode lead-out portion 30 is welded to the negative electrode tab and the negative electrode lead-out portion 30 through the negative electrode adapter 40. The positive electrode lead-out portion 50 is welded to the positive electrode tab and the positive electrode lead-out portion 50 through the positive electrode adapter 60.

Referring to FIG. 12, in some embodiments, the negative electrode lead-out portion 30 is an integrally formed structure, a constituent material of the negative electrode lead-out portion 30 includes element aluminum, and a mass percentage of the element aluminum is greater than a mass percentage of each of other elements.

In this embodiment, elements other than aluminum in the constituent material of the negative electrode lead-out portion having an integrally formed structure may include one or more of copper, manganese, silicon, magnesium, zinc, nickel, iron, titanium, chromium, zirconium, cobalt, and rare earth elements, and may also include elements as impurities.

For the negative electrode lead-out portion 30 having an integrally formed structure, the overall constituent material includes element aluminum, and a mass percentage of the element aluminum is greater than that of each of other elements. The battery cell is electrically connected to the negative electrode current collector and an external conductor through the negative electrode lead-out portion 30. Compared to related technologies that copper foil is used as a negative electrode current collector and a more complex copper-aluminum composite pole needs to be designed for welding with the copper foil and aluminum busbar component on the inner and outer sides of the battery cell, such negative electrode lead-out portion 30 with aluminum as a primary element can be electrically connected to an aluminum negative electrode current collector and a busbar component made of pure aluminum or aluminum alloy, such as an aluminum busbar. This not only improves connection reliability of fixed connection methods such as welding, but also further simplifies a structure of the negative electrode lead-out portion 30, reducing processing complexity and cost.

In some embodiments, the constituent material of the metal substrate 121*b* and the constituent material of the negative electrode lead-out portion 30 each include element aluminum with a mass percentage greater than or equal to 90%.

The constituent material of the metal substrate of the negative electrode current collector and the constituent material of the negative electrode lead-out portion each include an aluminum alloy material or pure aluminum material with a mass percentage of element aluminum greater than or equal to 90%, so as to achieve good conductivity and reduce weight. Additionally, since both constituent materials contain a high content of element aluminum, reliable connection effects are more easily achieved during connection processes such as welding.

To facilitate installation of the negative electrode lead-out portion 30, the negative electrode lead-out portion 30 is fixed on a side of a top cover 22 of the housing 20 far from the electrode assembly 10, and a protrusion is formed on the negative electrode adapter 40 to run through a through-hole on the top cover 22 for welding with the negative electrode lead-out portion 30.

Referring to FIG. 12, in some embodiments, the positive electrode lead-out portion 50 is an integrally formed structure. The positive electrode lead-out portion having an integrally formed structure has good conductive performance and eliminates operations for connecting the positive electrode internal connection portion and the positive electrode external connection portion, reducing process steps. Correspondingly, the constituent material of the positive electrode lead-out portion 50 includes element aluminum, and a mass percentage of the element aluminum is greater than a mass percentage of each of other elements, and optionally, the constituent material of the positive electrode lead-out portion 50 includes element aluminum with a mass percentage greater than or equal to 90%.

In this embodiment, elements other than aluminum in the constituent material of the positive electrode lead-out portion may include one or more of copper, manganese, silicon, magnesium, zinc, nickel, iron, titanium, chromium, zirconium, cobalt, and rare earth elements, and may also include elements as impurities.

To facilitate installation of the positive electrode lead-out portion 50, the positive electrode lead-out portion 50 is fixed on a side of the top cover 22 of the housing 20 far from the electrode assembly 10, and a protrusion is formed on the positive electrode adapter 60 to run through a through-hole on the top cover 22 for welding with the positive electrode lead-out portion 50.

Figure 13:
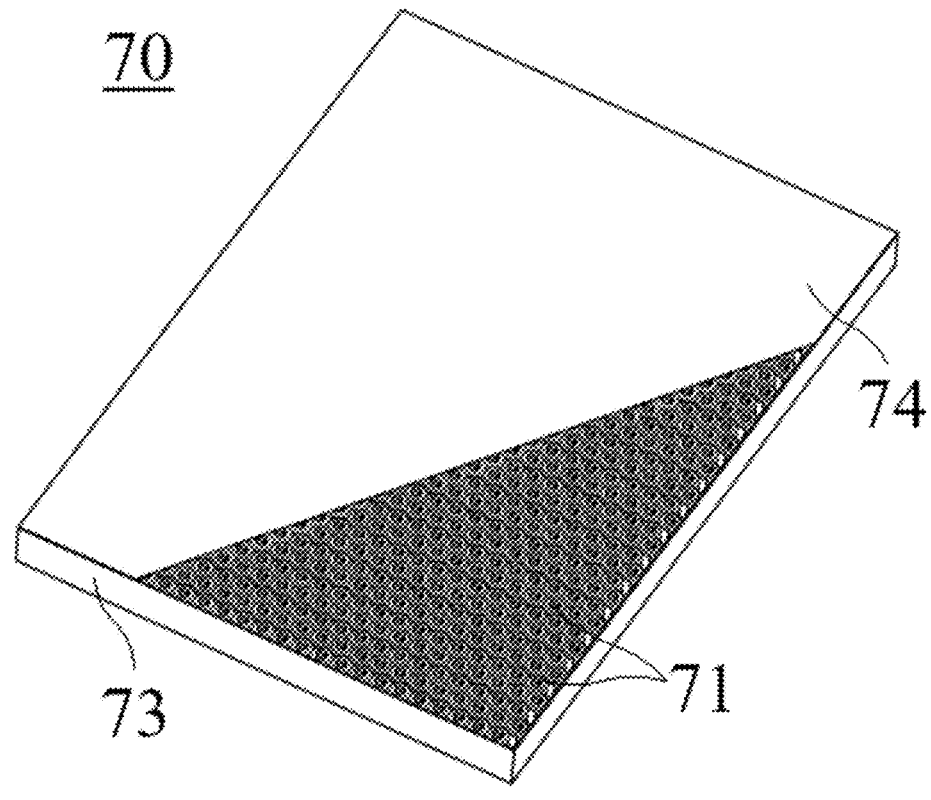
FIG. 13 is a schematic exploded view of a battery according to some other embodiments of the present disclosure.
Figure 14:
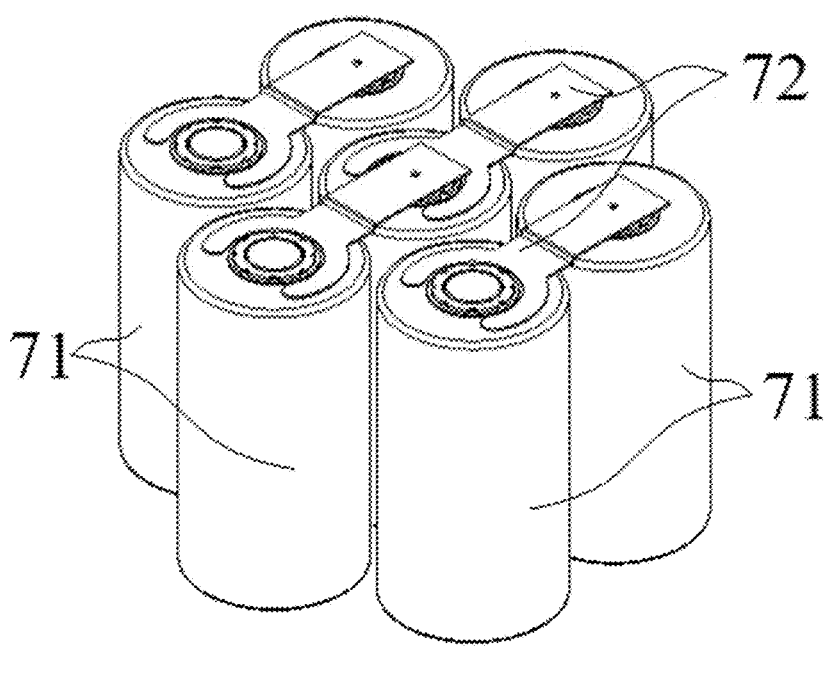
FIG. 14 is a schematic diagram of connection of a plurality of battery cells according to some other embodiments of the present disclosure.
Figure 15:
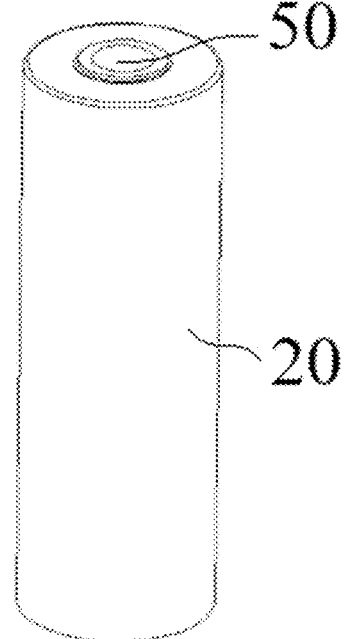
FIG. 15 is a schematic structural diagram of a battery cell according to some other embodiments of the present disclosure.

FIG. 13 is a schematic exploded view of a battery according to some other embodiments of the present disclosure. FIG. 14 is a schematic diagram of connection of a plurality of battery cells according to some other embodiments of the present disclosure. FIG. 15 is a schematic structural diagram of a battery cell according to some other embodiments of the present disclosure. Referring to FIG. 13 to FIG. 15, in some embodiments, the foregoing battery cell embodiments are also applicable to cylindrical battery cells 71.

In FIG. 13, the battery 70 includes a battery box and a plurality of battery cells 71 disposed within the battery box. The battery box can provide functions such as accommodation, support, cooling, sealing, and impact resistance for the battery cells 71, and can also prevent external liquids or other foreign objects from adversely affecting charging, discharging, or safety of the battery cells. The battery box may include a box body 73 and a box cover 74 engaged with the box body 73.

In FIG. 14, the battery cells 71 may be electrically connected through a busbar component 72, for example, in series, parallel, or series-parallel, to implement required electrical performance parameters of the battery 70. A plurality of battery cells 71 are arranged in rows, and one or more rows of battery cells 71 may be provided in the box body as needed. One or more layers of battery cells 71 may also be arranged along a height direction of the battery 70 as needed.

Figure 16:
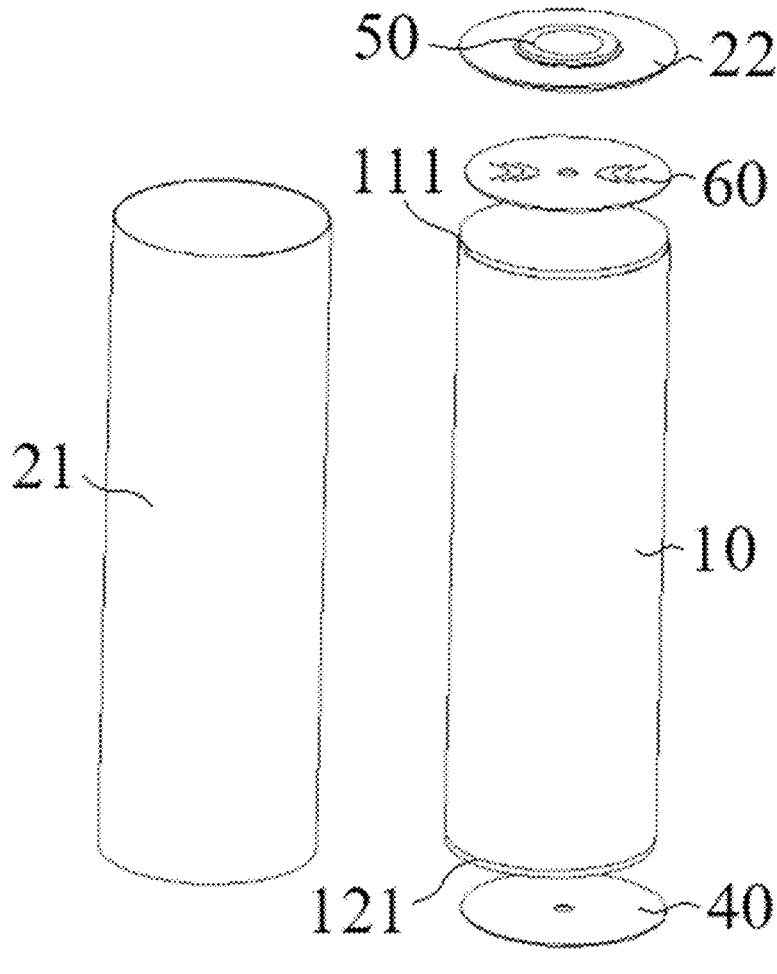
FIG. 16 is a schematic exploded view of the embodiment shown in FIG. 15.
Figure 17:
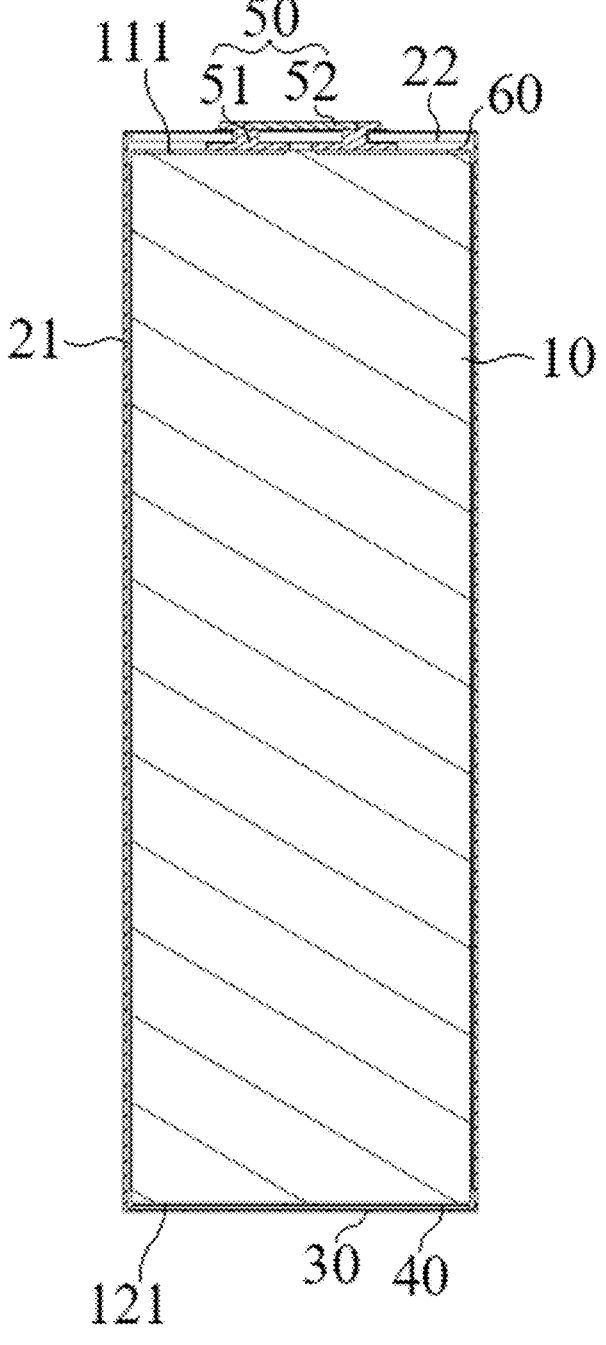
FIG. 17 is a schematic cross-sectional view of the embodiment shown in FIG. 15.

FIG. 16 is a schematic exploded view of the embodiment shown in FIG. 15. FIG. 17 is a schematic cross-sectional view of the embodiment shown in FIG. 15. Referring to FIG. 15 to FIG. 17 above, the housing 20 may include a cylindrical casing 21 and a top cover 22 located at an end opening of one end of the casing 21. The positive electrode lead-out portion 50 is disposed on the top cover 22. The positive electrode lead-out portion 50 may be a split structure, and includes a positive electrode internal connection portion 51 located inside the casing 21 and partially protruding from a through-hole on the top cover 22, and a positive electrode external connection portion 52 located outside the casing 21 and fixedly connected to the positive electrode internal connection portion 51. The positive electrode internal connection portion 51 may be welded to the positive electrode current collector 111 of the electrode assembly 10 via the positive electrode adapter 60.

The negative electrode lead-out portion 30 may be an integrally formed structure or a split structure. For example, the casing 21 serving as an integrally formed negative electrode lead-out portion 30 may be welded to the negative electrode current collector 121 of the electrode assembly 10 via the negative electrode adapter 40. For another example, the negative electrode lead-out portion 30 may include a casing 21 assembled and a top cover 22 electrically connected thereto. Correspondingly, the casing 21 serves as a negative electrode internal connection portion of the negative electrode lead-out portion 30, and the top cover 22 serves as a negative electrode external connection portion of the negative electrode lead-out portion 30, and is insulated from the positive electrode lead-out portion 50.

In some other embodiments, the negative electrode lead-out portion 30 may be disposed on the top cover 22, and the casing 21 serves as an integrally formed positive electrode lead-out portion 50, or the casing 21 and the top cover 22 electrically connected thereto serve as a positive electrode internal connection portion and a positive electrode external connection portion of a split positive electrode lead-out portion 50, respectively. In still some embodiments, both the positive electrode lead-out portion 50 and the negative electrode lead-out portion 30 may be disposed on the top cover 22.

Figure 18:
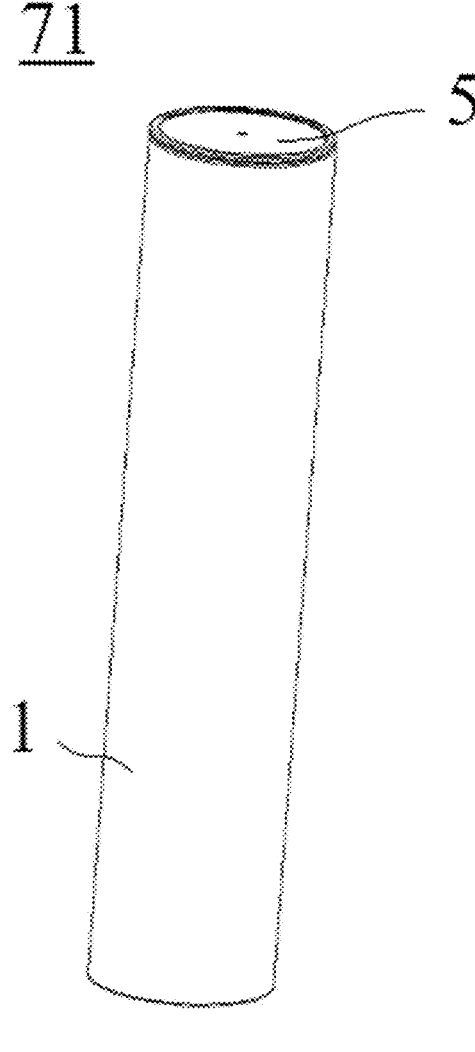
FIG. 18 is a schematic structural diagram of a battery cell according to still some embodiments of the present disclosure.
Figure 19:
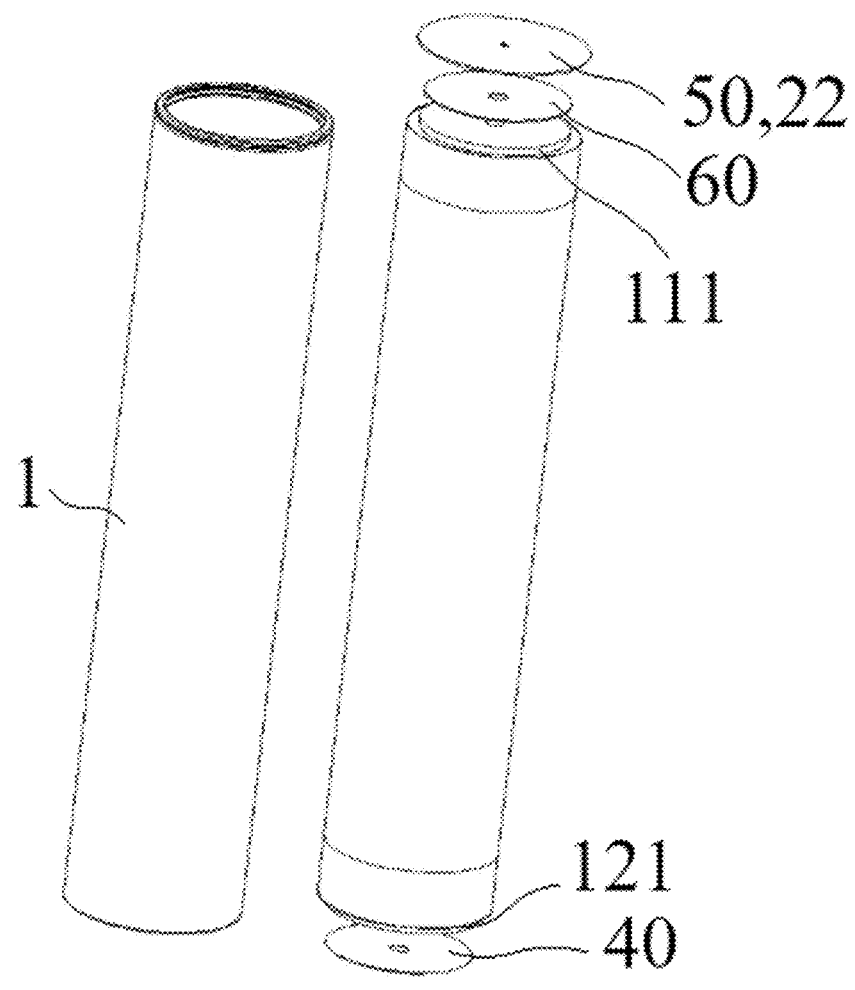
FIG. 19 is a schematic exploded view of the embodiment shown in FIG. 18.
Figure 20:
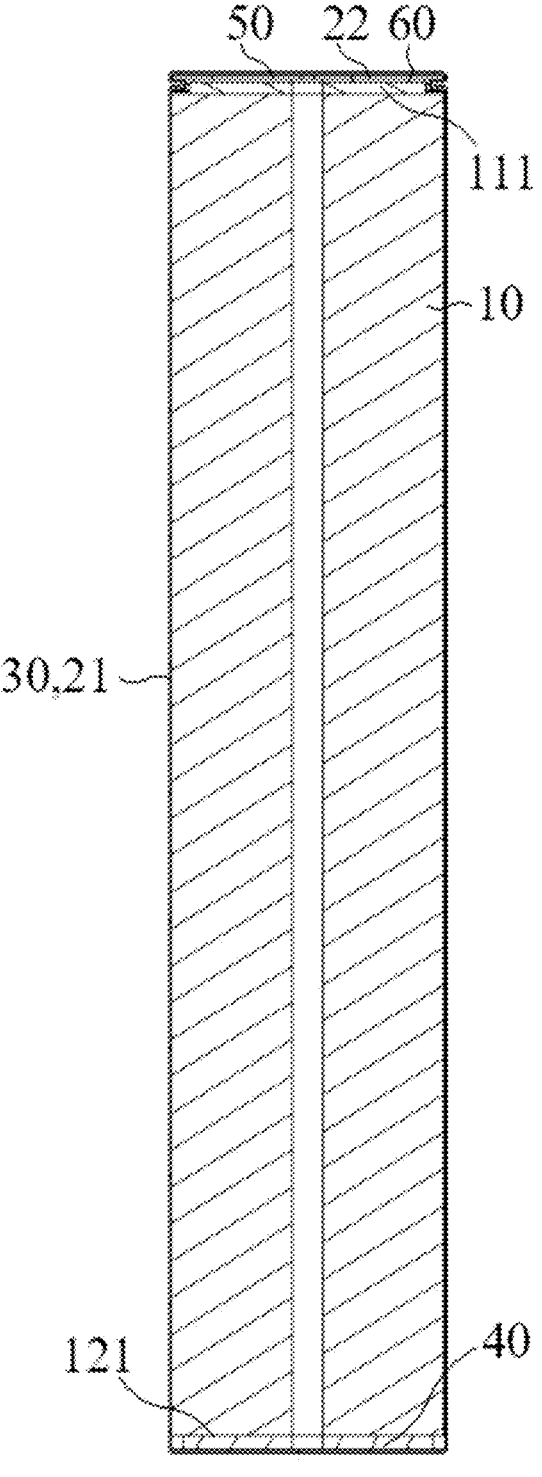
FIG. 20 is a schematic cross-sectional view of the embodiment shown in FIG. 18.

FIG. 18 is a schematic structural diagram of a battery cell according to still some embodiments of the present disclosure. FIG. 19 is a schematic exploded view of the embodiment shown in FIG. 18. FIG. 20 is a schematic cross-sectional view of the embodiment shown in FIG. 18. FIG. 18 to FIG. 20 show embodiments of another form of cylindrical battery cell.

Referring to FIG. 18 to FIG. 20, in some embodiments, the housing 20 includes a casing 21 and a top cover 22, one end of the casing 21 has an end opening, and the top cover 22 covers and is fixed to the end opening; where the top cover 22 serving as the positive electrode lead-out portion 50 is electrically connected to the positive electrode current collector 111 and configured to be connected to a conductor outside the battery cell 71; and a casing wall of the casing 21 serving as the negative electrode lead-out portion 30 is electrically connected to the metal substrate 121*b* and configured to be connected to a conductor outside the battery cell 71.

For the negative electrode lead-out portion having an integrally formed structure, using a casing wall of the casing as the negative electrode lead-out portion to electrically connect to the metal substrate and the external conductor provides a larger electrical connection area for the negative electrode lead-out portion, reducing internal resistance. Moreover, the structure is simpler with less space occupation, facilitating further improvement in battery capacity. Using the top cover as the positive electrode lead-out portion to connect to the positive electrode current collector and the external conductor provides a larger electrical connection area for the positive electrode lead-out portion, reducing internal resistance and facilitating connection to the external conductor.

Figure 21:
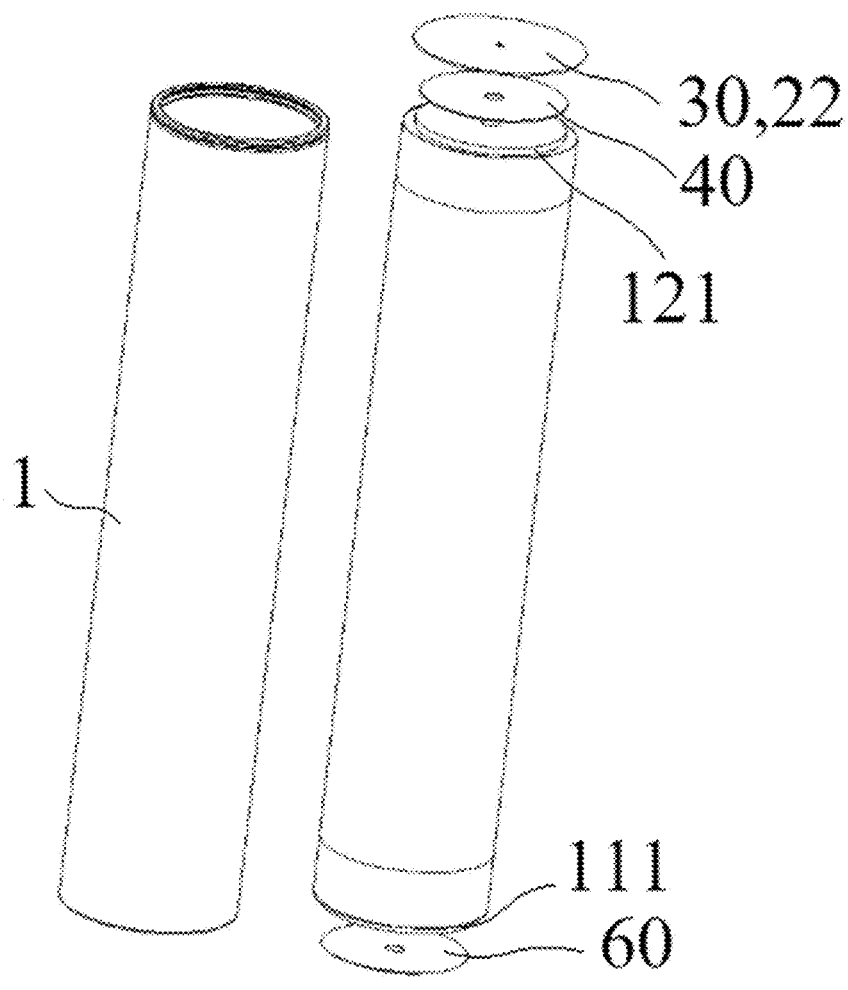
FIG. 21 is a schematic exploded view of another embodiment with reference to FIG. 19.

FIG. 21 is a schematic exploded view of another embodiment with reference to FIG. 19. Referring to FIG. 21, compared to the embodiment shown in FIG. 19, the housing 20 includes a casing 21 and a top cover 22, one end of the casing 21 has an end opening, and the top cover 22 covers and is fixed to the end opening. The top cover 22 serving as the negative electrode lead-out portion 30 is electrically connected to the metal substrate 121b and configured to be connected to a conductor outside the battery cell 71; and a casing wall of the casing 21 serving as the positive electrode lead-out portion 50 is electrically connected to the positive electrode current collector 111 and configured to be connected to a conductor outside the battery cell 71.

For the negative electrode lead-out portion having an integrally formed structure, using the top cover as the negative electrode lead-out portion to electrically connect to the metal substrate and the external conductor provides a larger electrical connection area for the negative electrode lead-out portion, reducing internal resistance. Moreover, the structure is simpler with less space occupation, facilitating further improvement in battery capacity. Using a casing wall of the casing as the positive electrode lead-out portion to connect to the positive electrode current collector and the external conductor provides a larger electrical connection area for the positive electrode lead-out portion, reducing internal resistance and facilitating connection to the external conductor.

Figure 22:
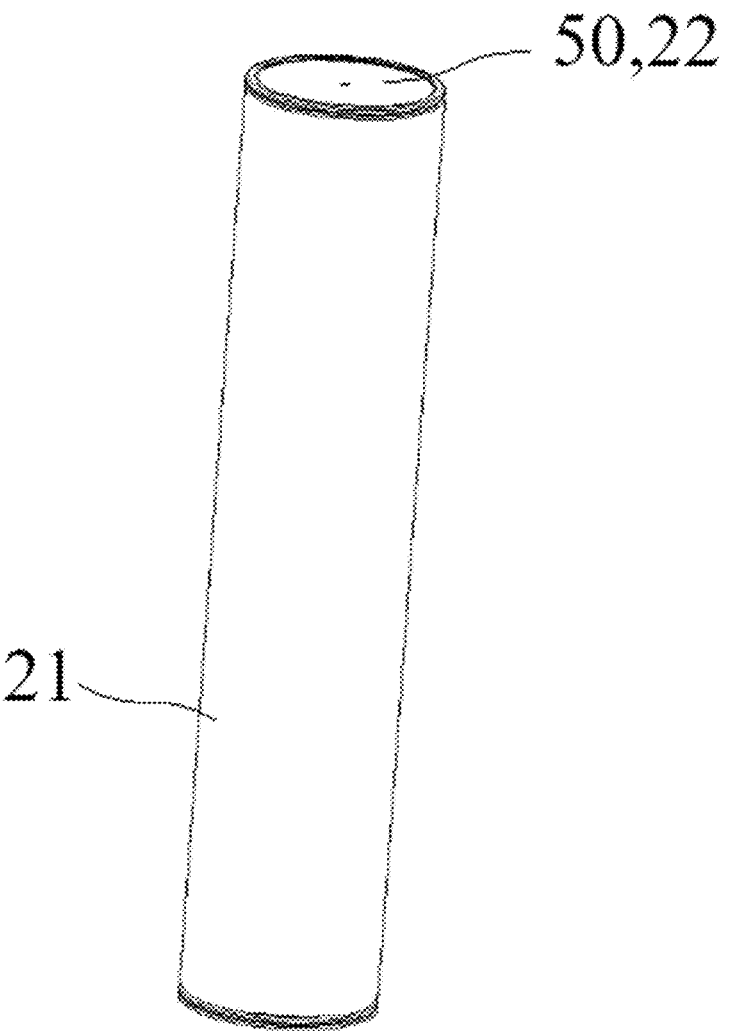
FIG. 22 is a schematic structural diagram of a battery cell according to yet some embodiments of the present disclosure.
Figure 23:
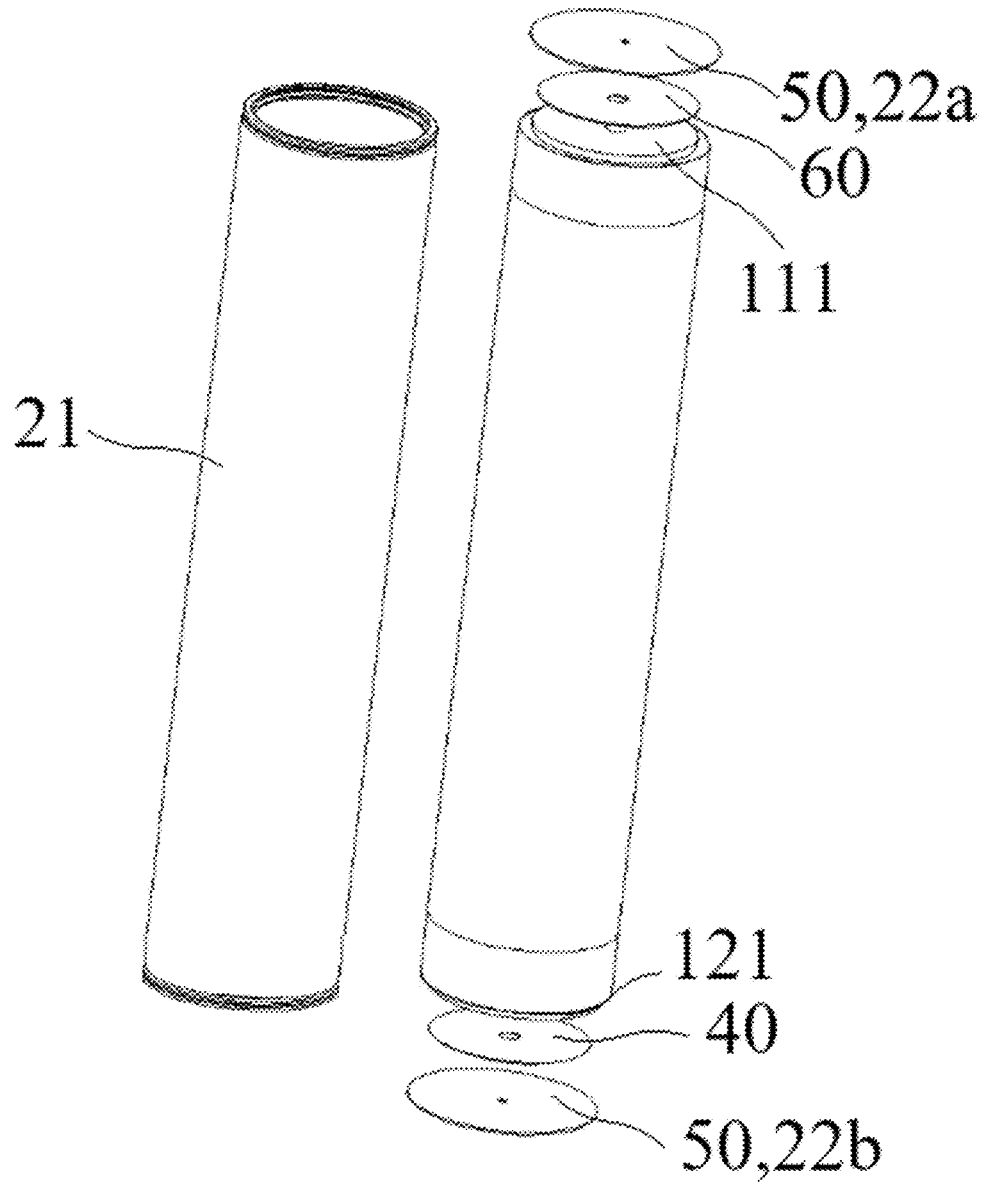
FIG. 23 is a schematic exploded view of the embodiment shown in FIG. 22.
Figure 24:
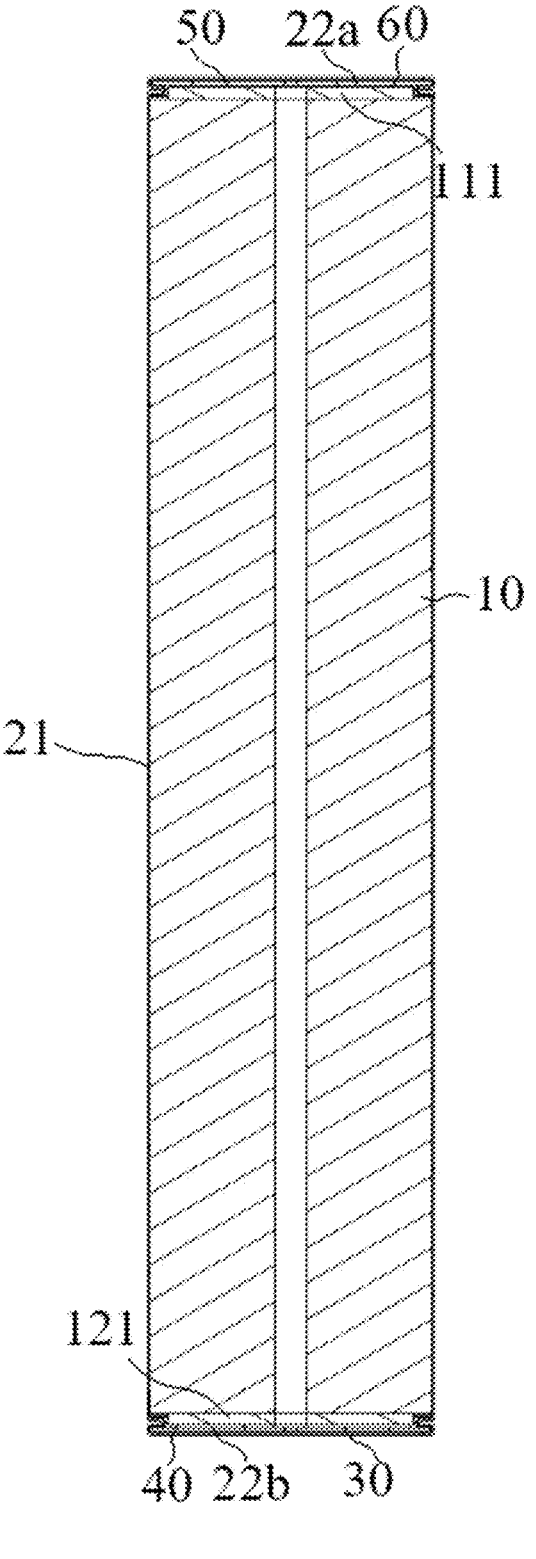
FIG. 24 is a schematic cross-sectional view of the embodiment shown in FIG. 22.

FIG. 22 is a schematic structural diagram of a battery cell according to yet some embodiments of the present disclosure. FIG. 23 is a schematic exploded view of the embodiment shown in FIG. 22. FIG. 24 is a schematic cross-sectional view of the embodiment shown in FIG. 22. FIG. 22 to FIG. 24 show embodiments of still another form of cylindrical battery cell.

Referring to FIG. 22 to FIG. 24, in some embodiments, the housing 20 includes a casing 21, a first top cover 22a, and a second top cover 22b, two opposite ends of the casing 21 each have an end opening, and the first top cover 22a and the second top cover 22b respectively cover and are fixed to the end openings at the two opposite ends of the casing 21. The second top cover 22b serving as the negative electrode lead-out portion 30 is electrically connected to the metal substrate 121b and configured to be connected to a conductor outside the battery cell 71; and the first top cover 22a serving as the positive electrode lead-out portion 50 is electrically connected to the positive electrode current collector 111 and configured to be connected to a conductor outside the battery cell 71.

For the negative electrode lead-out portion having an integrally formed structure, using the second top cover as the negative electrode lead-out portion to electrically connect to the metal substrate and the external conductor provides a larger electrical connection area for the negative electrode lead-out portion, reducing internal resistance. Moreover, the structure is simpler with less space occupation, facilitating further improvement in battery capacity. Using the first top cover as the positive electrode lead-out portion to connect to the positive electrode current collector and the external conductor provides a larger electrical connection area for the positive electrode lead-out portion, reducing internal resistance and facilitating connection to the external conductor.

Figure 25:
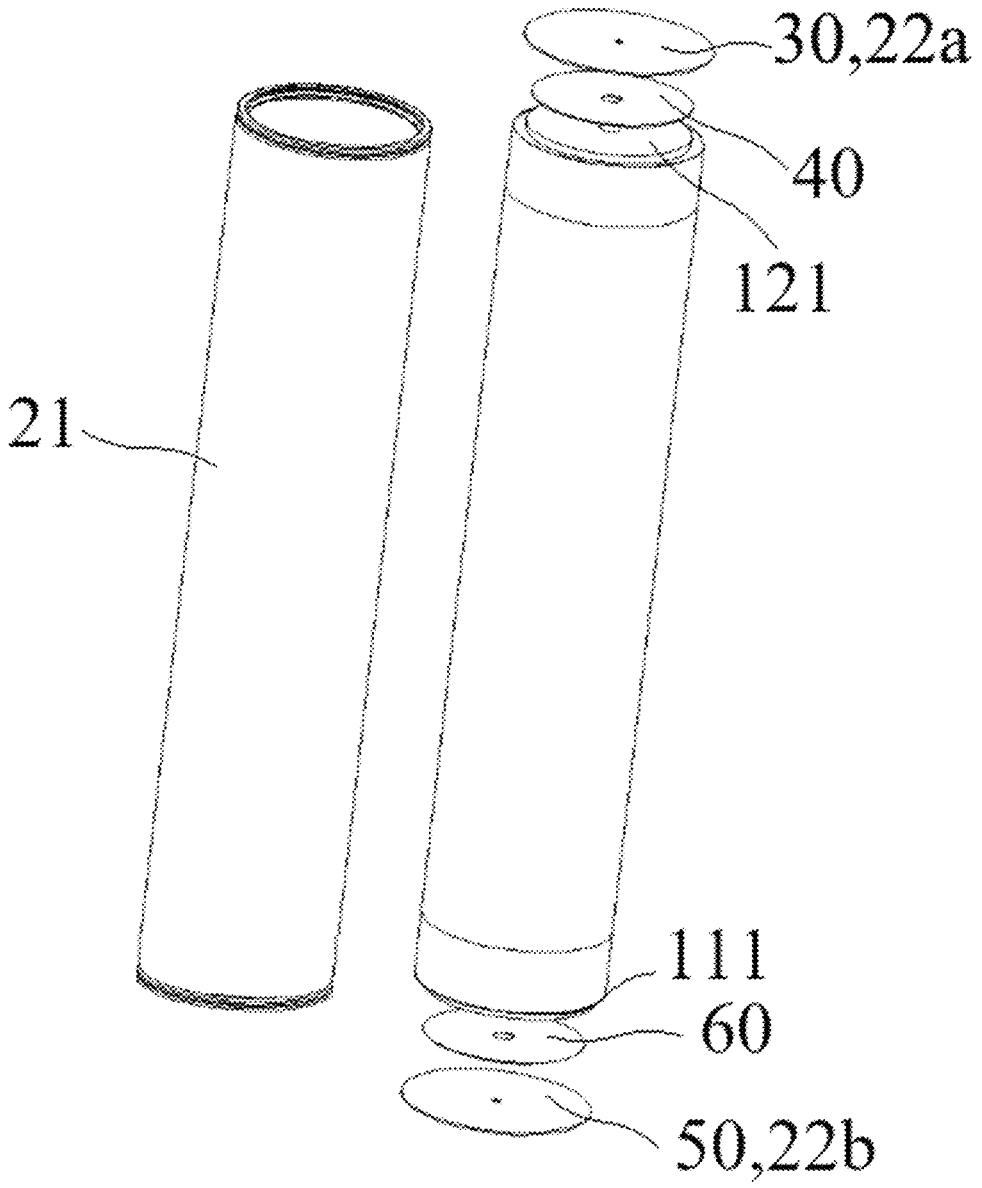
FIG. 25 is a schematic exploded view of another embodiment with reference to FIG. 23.

FIG. 25 is a schematic exploded view of another embodiment with reference to FIG. 23. Referring to FIG. 25, compared to the embodiment shown in FIG. 23, the housing 20 includes a casing 21, a first top cover 22a, and a second top cover 22b, two opposite ends of the casing 21 each have an end opening, and the first top cover 22a and the second top cover 22b respectively cover and are fixed to the end openings at the two opposite ends of the casing 21. The first top cover 22a serving as the negative electrode lead-out portion 30 is electrically connected to the metal substrate 121b and configured to be connected to a conductor outside the battery cell 71; and the second top cover 22b serving as the positive electrode lead-out portion 50 is electrically connected to the positive electrode current collector 111 and configured to be connected to a conductor outside the battery cell 71.

For the negative electrode lead-out portion having an integrally formed structure, using the first top cover as the negative electrode lead-out portion to electrically connect to the metal substrate and the external conductor provides a larger electrical connection area for the negative electrode lead-out portion, reducing internal resistance. Moreover, the structure is simpler with less space occupation, facilitating further improvement in battery capacity. Using the second top cover as the positive electrode lead-out portion to connect to the positive electrode current collector and the external conductor provides a larger electrical connection area for the positive electrode lead-out portion, reducing internal resistance and facilitating connection to the external conductor.

According to an aspect of the present disclosure, a battery 70 is provided, including the battery cell 71 according to any one of the foregoing embodiments.

A battery using the foregoing battery cell can reduce weight and cost.

Referring to FIG. 2, FIG. 3, FIG. 13, and FIG. 14, in some embodiments, the battery 70 includes a plurality of the battery cells 71, and further includes a busbar component 72 configured to electrically connect the plurality of the battery cells 71, where a constituent material of the busbar component 72 includes element aluminum with a mass percentage greater than that of any other element.

In this embodiment, elements other than aluminum in the constituent material of the busbar component 72 may include one or more of copper, manganese, silicon, magnesium, zinc, nickel, iron, titanium, chromium, zirconium, cobalt, and rare earth elements, and may also include elements as impurities.

The busbar component 72 with a constituent material including element aluminum with a mass percentage greater than that of any other element is used to implement electrical connection of the plurality of the battery cells 71, allowing the busbar component 72 to be more easily and reliably welded with the negative electrode lead-out portion 30 having a constituent material including element aluminum with a mass percentage greater than that of any other element. The busbar component 72 serving as a conductor outside the battery cell 71 may be electrically connected to at least one of the negative electrode lead-out portion and the positive electrode lead-out portion of the battery cell 71.

In some embodiments, the constituent material of the busbar component 72 includes element aluminum with a mass percentage greater than or equal to 90%.

The constituent material of the busbar component 72 includes an aluminum alloy material or pure aluminum material with a mass percentage of element aluminum greater than or equal to 90%, facilitating reliable connection effects during connection processes such as welding.

According to an aspect of the present disclosure, an electric apparatus is provided, including the battery 70 according to any one of the foregoing embodiments.

An electric apparatus using the foregoing battery can reduce weight and cost.

In some specific embodiments, as shown in FIG. 4 to FIG. 8 and FIG. 10, a battery cell 71 includes: an electrode assembly 10, a prismatic housing 20, a negative electrode lead-out portion 30, a negative electrode adapter 40, a positive electrode lead-out portion 50, and a positive electrode adapter 60. The electrode assembly 10 includes a positive electrode plate 11 and a negative electrode plate 12, where the positive electrode plate 11 includes a positive electrode current collector 111 and a positive electrode active material 112 disposed on the positive electrode current collector 111, and the negative electrode plate 12 includes a negative electrode current collector 121 and a negative electrode active material 122 disposed on the negative electrode current collector 121. The positive electrode active material 112 includes at least one of sodium-containing layered transition metal oxide, sodium-containing phosphate, and Prussian blue analogue. The negative electrode current collector 121 is constituted by the metal substrate 121b, and the positive electrode current collector 111 is a metal current collector.

The housing 20 includes a casing 21 and a top cover 22 disposed at an end opening of the casing 21. The negative electrode lead-out portion 30 and the positive electrode lead-out portion 50 are both disposed on the top cover 22. One end of the negative electrode adapter 40 is welded to the negative electrode lead-out portion 30, and another end is welded to the negative electrode current collector 121. One end of the positive electrode adapter 60 is welded to the positive electrode lead-out portion 50, and another end is welded to the positive electrode current collector 111.

The negative electrode lead-out portion 30 is a split structure, and includes a negative electrode internal connection portion 31 located on an inner side of the top cover 22, and a negative electrode external connection portion 32 connected to the negative electrode internal connection portion 31 and located on an outer side of the top cover 22. The positive electrode lead-out portion 50 is a split structure, and includes a positive electrode internal connection portion 51 located on the inner side of the top cover 22, and a positive electrode external connection portion 52 connected to the positive electrode internal connection portion 51 and located on the outer side of the top cover 22.

For the negative electrode internal connection portion 31, the negative electrode external connection portion 32, the negative electrode adapter 40, the positive electrode internal connection portion 51, the positive electrode external connection portion 52, and the positive electrode adapter 60, their constituent materials all include an aluminum alloy material or pure aluminum material with a mass percentage of element aluminum greater than or equal to 90%. The constituent materials of the metal substrate 121b of the negative electrode current collector 121 and the positive electrode current collector 111 each include a pure aluminum material with a mass percentage of element aluminum greater than or equal to 99%. The constituent material of the busbar component 72 used for connecting the battery cells 71 also includes an aluminum alloy material or pure aluminum material with a mass percentage of element aluminum greater than or equal to 90%.

In some specific embodiments, as shown in FIG. 8, FIG. 10, and FIG. 18 to FIG. 20, a battery cell 71 includes: an electrode assembly 10, a cylindrical housing 20, a negative electrode lead-out portion 30, a negative electrode adapter 40, a positive electrode lead-out portion 50, and a positive electrode adapter 60. The electrode assembly 10 includes a positive electrode plate 11 and a negative electrode plate 12, where the positive electrode plate 11 includes a positive electrode current collector 111 and a positive electrode active material 112 disposed on the positive electrode current collector 111, and the negative electrode plate 12 includes a negative electrode current collector 121 and a negative electrode active material 122 disposed on the negative electrode current collector 121. The positive electrode active material 112 includes at least one of sodium-containing layered transition metal oxide, sodium-containing phosphate, and Prussian blue analogue. The negative electrode current collector 121 is constituted by the metal substrate 121b, and the positive electrode current collector 111 is a metal current collector.

The housing 20 includes a casing 21 serving as the negative electrode lead-out portion 30 and a top cover 22 disposed at an end opening of the casing 21 and serving as the positive electrode lead-out portion 50, the top cover 22 and the casing 21 being insulated from each other by an insulating member. One end of the negative electrode adapter 40 is welded to the negative electrode current collector 121, and another end is welded to a bottom of a casing wall of the casing 21. One end of the positive electrode adapter 60 is welded to the top cover 22, and another end is welded to the positive electrode current collector 111.

For the casing 21, the negative electrode adapter 40, the top cover 22, and the positive electrode adapter 60, their constituent materials all include an aluminum alloy material or pure aluminum material with a mass percentage of element aluminum greater than or equal to 90%. The constituent materials of the metal substrate 121b of the negative electrode current collector 121 and the positive electrode current collector 111 each include a pure aluminum material with a mass percentage of element aluminum greater than or equal to 99%. The constituent material of the busbar component 72 used for connecting the battery cells 71 also includes an aluminum alloy material or pure aluminum material with a mass percentage of element aluminum greater than or equal to 90%.

In some specific embodiments, as shown in FIG. 9, FIG. 11, and FIG. 22 to FIG. 24, a battery cell 71 includes: an electrode assembly 10, a cylindrical housing 20, a negative electrode lead-out portion 30, a negative electrode adapter 40, a positive electrode lead-out portion 50, and a positive electrode adapter 60. The electrode assembly 10 includes a positive electrode plate 11 and a negative electrode plate 12, where the positive electrode plate 11 includes a positive electrode current collector 111 and a positive electrode active material 112 disposed on the positive electrode current collector 111, and the negative electrode plate 12 includes a negative electrode current collector 121 and a negative electrode active material 122 disposed on the negative electrode current collector 121. The positive electrode active material 112 includes at least one of sodium-containing layered transition metal oxide, sodium-containing phosphate, and Prussian blue analogue.

The negative electrode current collector 121 includes a metal substrate 121b and a first insulating material layer 121i, where the metal substrates 121b are disposed on two sides of the first insulating material layer 121i along a thickness direction. The positive electrode current collector 111 includes: a second insulating material layer 111i and conductive layers 111c located on two sides of the second insulating material layer 111i in a thickness direction of the second insulating material layer 111i.

The housing 20 includes: a casing 21; and a first top cover 22a and a second top cover 22b disposed at end openings of two ends of the casing 21 and serving as the positive electrode lead-out portion 50 and the negative electrode lead-out portion 30, respectively. Both the first top cover 22a and the second top cover 22b are insulated from the casing 21 by insulating members. One end of the negative electrode adapter 40 is welded to the negative electrode current collector 121, and another end is welded to the second top cover 22b. One end of the positive electrode adapter 60 is welded to the first top cover 22a, and another end is welded to the positive electrode current collector 111.

For the second top cover 22b, the negative electrode adapter 40, the first top cover 22a, and the positive electrode adapter 60, their constituent materials all include an aluminum alloy material or pure aluminum material with a mass percentage of element aluminum greater than or equal to 90%. The constituent materials of the metal substrate 121b of the negative electrode current collector 121 and the conductive layers 111c of the positive electrode current collector 111 each include a pure aluminum material with a mass percentage of element aluminum greater than or equal to 99%. The constituent material of the busbar component 72 used for connecting the battery cells 71 also includes an aluminum alloy material or pure aluminum material with a mass percentage of element aluminum greater than or equal to 90%.

Although the present disclosure has been described with reference to preferred embodiments, various improvements can be made thereto and components therein can be replaced with equivalents without departing from the scope of the present disclosure. In particular, as long as there is no structural conflict, the various technical features mentioned in the embodiments can be combined in any manner. The present disclosure is not limited to the specific embodiments disclosed in this specification but includes all technical solutions falling within the scope of the claims.

What is claimed is:

1. A battery cell, comprising:
an electrode assembly, comprising:
  a positive electrode plate comprising a positive electrode current collector and a positive electrode active material disposed on the positive electrode current collector, the positive electrode active material comprising an active material configured to reversibly deintercalate and intercalate sodium ions; and
  a negative electrode plate comprising a negative electrode current collector, the negative electrode current collector comprising two metal substrates, the metal substrates disposed on two sides of a first insulating material layer along a thickness direction; and
a negative electrode adapter electrically connecting the metal substrates and a negative electrode lead-out portion,
wherein a constituent material of the metal substrates comprise element aluminum, and a mass percentage of the element aluminum is greater than a mass percentage of each of other elements,
wherein a constituent material of the negative electrode adapter comprises element aluminum with a mass percentage greater than or equal to 90%,
wherein a constituent material of the negative electrode lead-out portion comprises element aluminum, a mass percentage of the element aluminum being greater than a mass percentage of each of other elements.

2. The battery cell according to claim 1, further comprising:
  a housing having a chamber for accommodating the electrode assembly, wherein the negative electrode lead-out portion is disposed on the housing and configured to electrically connect the metal substrates and a conductor outside the battery cell.

3. The battery cell according to claim 2, wherein the negative electrode lead-out portion is an integrally formed structure.

4. The battery cell according to claim 3, wherein a constituent material of the metal substrate and a constituent material of the negative electrode lead-out portion each comprise element aluminum with a mass percentage greater than or equal to 90%.

5. The battery cell according to claim 3, wherein the housing comprises a casing and a top cover, one end of the casing has an end opening, and the top cover covers and is fixed to the end opening;
  wherein the top cover serving as the negative electrode lead-out portion is electrically connected to the metal substrates and configured to be connected to a conductor outside the battery cell; and a casing wall of the casing serving as the positive electrode lead-out portion is electrically connected to the positive electrode current collector and configured to be connected to a conductor outside the battery cell; or
  the top cover serving as the positive electrode lead-out portion is electrically connected to the positive electrode current collector and configured to be connected to a conductor outside the battery cell; and a casing wall of the casing serving as the negative electrode lead-out portion is electrically connected to the metal substrates and configured to be connected to a conductor outside the battery cell.

6. The battery cell according to claim 3, wherein the housing comprises a casing, a first top cover, and a second top cover, two opposite ends of the casing each have an end opening, and the first top cover and the second top cover respectively cover and are fixed to the end openings at the two opposite ends of the casing;
  wherein the first top cover serving as the negative electrode lead-out portion is electrically connected to the metal substrates and configured to be connected to a conductor outside the battery cell; and the second top cover serving as the positive electrode lead-out portion is electrically connected to the positive electrode current collector and configured to be connected to a conductor outside the battery cell; or
  the second top cover serving as the negative electrode lead-out portion is electrically connected to the metal substrates and configured to be connected to a conductor outside the battery cell; and the first top cover serving as the positive electrode lead-out portion is electrically connected to the positive electrode current collector and configured to be connected to a conductor outside the battery cell.

7. The battery cell according to claim 2, wherein the negative electrode lead-out portion is a split structure, and the negative electrode lead-out portion comprises a negative electrode internal connection portion and a negative electrode external connection portion fixedly connected, wherein the negative electrode internal connection portion is electrically connected to the metal substrates, the negative electrode external connection portion is configured to be connected to a conductor outside the battery cell, and a constituent material of the negative electrode internal connection portion and a constituent material of the negative electrode external connection portion each comprise element aluminum, a mass percentage of the element aluminum being greater than a mass percentage of each of other elements.

8. The battery cell according to claim 7, wherein the constituent material of the metal substrates, the constituent material of the negative electrode internal connection portion, and the constituent material of the negative electrode external connection portion each comprise element aluminum with a mass percentage greater than or equal to 90%.

9. The battery cell according to claim 1, wherein the negative electrode current collector is constituted by the metal substrates, and the constituent material of the metal substrates comprises element aluminum with a mass percentage greater than or equal to 99%.

10. The battery cell according to claim 1, wherein the constituent material of the metal substrates comprises element aluminum with a mass percentage greater than or equal to 99%.

11. The battery cell according to claim 1, further comprising:

a housing having a chamber for accommodating the electrode assembly; and a positive electrode lead-out portion disposed on the housing, configured to electrically connect the positive electrode current collector and a conductor outside the battery cell; and, a constituent material of the positive electrode lead-out portion comprises element aluminum, and a mass percentage of the element aluminum is greater than a mass percentage of each of other elements, wherein the constituent material of the positive electrode lead-out portion comprises element aluminum with a mass percentage greater than or equal to 90%;

the positive electrode current collector is a metal current collector, and a constituent material of the metal current collector comprises element aluminum with a mass percentage greater than or equal to 99%; and/or the positive electrode current collector comprises: a second insulating material layer and conductive layers located on two sides of the second insulating material layer in a thickness direction of the second insulating material layer, and a constituent material of the conductive layer comprises element aluminum with a mass percentage greater than or equal to 99%.

12. The battery cell according to claim 11, further comprising:

a positive electrode adapter electrically connected to the positive electrode lead-out portion and the positive electrode current collector;

wherein a constituent material of the positive electrode adapter comprises element aluminum, and a mass percentage of the element aluminum is greater than a mass percentage of each of other elements, wherein the constituent material of the positive electrode adapter comprises element aluminum with a mass percentage greater than or equal to 90%.

13. The battery cell according to claim 1, wherein the positive electrode active material comprises at least one of sodium-containing layered transition metal oxide, sodium-containing phosphate, and Prussian blue analogue.

14. A battery, comprising:

at least one battery cell according to claim 1; and a battery box.

15. The battery according to claim 14, wherein the battery comprises a plurality of the battery cells and further comprises a busbar component configured to electrically connect the plurality of the battery cells, and a constituent material of the busbar component comprises element aluminum with a mass percentage greater than that of any other element.

16. The battery according to claim 14, wherein the constituent material of the busbar component comprises element aluminum with a mass percentage greater than or equal to 90%.

17. An electric apparatus, comprising:

the battery according to 14; and a device in electrical communication with the battery.

\* \* \* \* \*